Jan. 13, 1959 W. J. CALDWELL 2,867,896
COIL INSERTING MACHINE FOR ARMATURES
Filed Feb. 9, 1954 15 Sheets-Sheet 1

INVENTOR.
Washington J. Caldwell
BY
Falvey, Souther & Stoltenberg

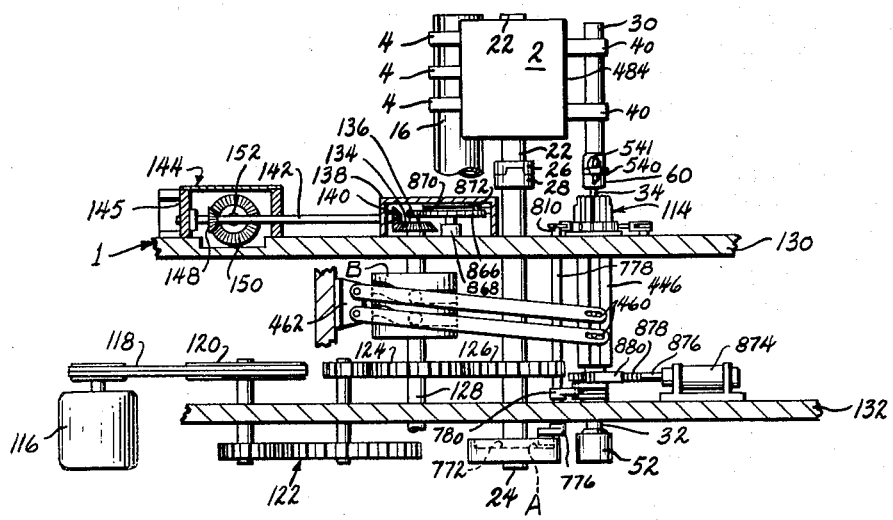
Fig. 3
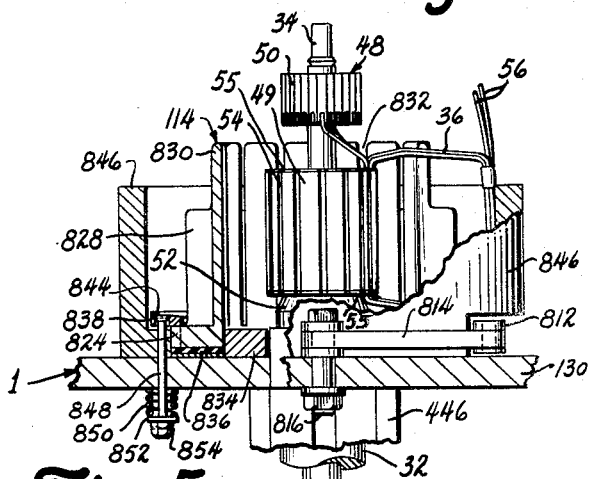
Fig. 5
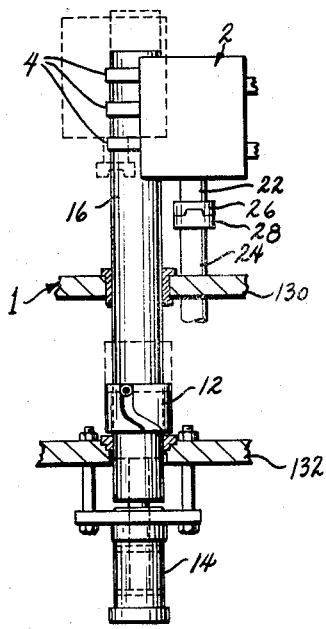
Fig. 4
Fig. 6
INVENTOR.
Washington J. Caldwell
BY
Falvey, Souther & Stoltenberg Jan. 13, 1959 W. J. CALDWELL 2,867,896
COIL INSERTING MACHINE FOR ARMATURES
Filed Feb. 9, 1954 15 Sheets-Sheet 3

INVENTOR.
Washington J. Caldwell
BY
Falvey, Souther & Stoltenberg

Jan. 13, 1959

W. J. CALDWELL 2,867,896

COIL INSERTING MACHINE FOR ARMATURES

Filed Feb. 9, 1954

INVENTOR.
Washington J. Caldwell
BY
Falvey, Souther & Stoltenberg

INVENTOR.
Washington J. Caldwell
BY
Falvey, Souther & Stoltenberg

Jan. 13, 1959 W. J. CALDWELL 2,867,896
COIL INSERTING MACHINE FOR ARMATURES
Filed Feb. 9, 1954 15 Sheets-Sheet 6

INVENTOR.
Washington J. Caldwell
BY
Falvey, Souther & Stoetenberg

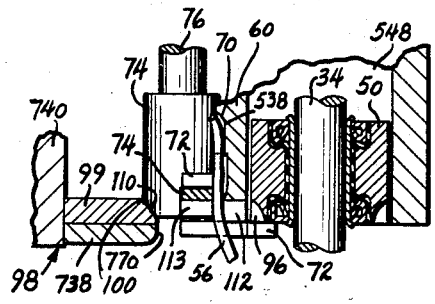
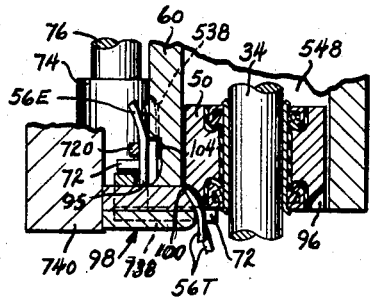
Fig. 27  Fig. 28
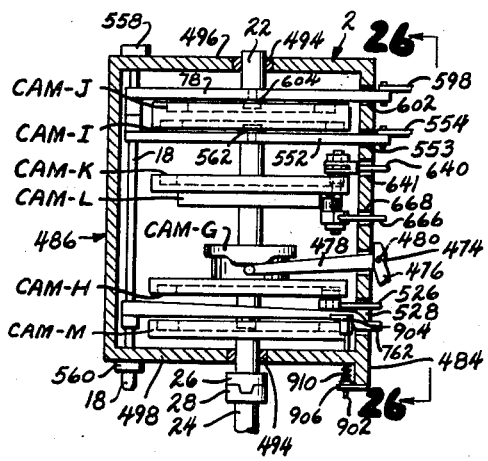
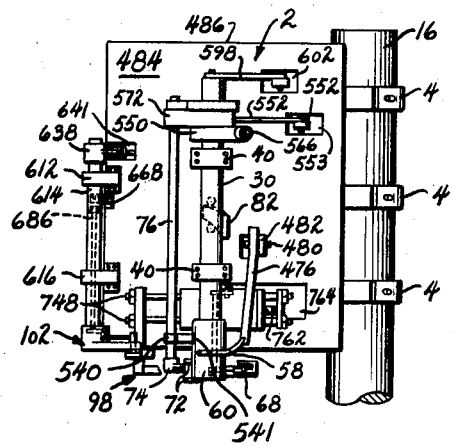
Fig. 25  Fig. 26
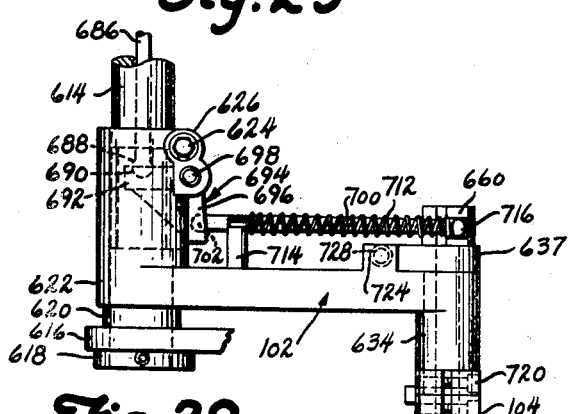
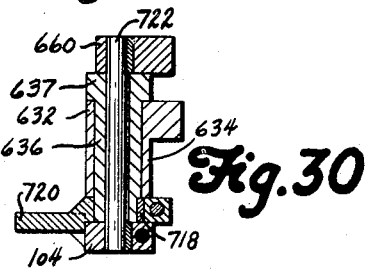
Fig. 29  Fig. 30
INVENTOR.
Washington J. Caldwell
BY
Fahey, Souther & Stoltenberg

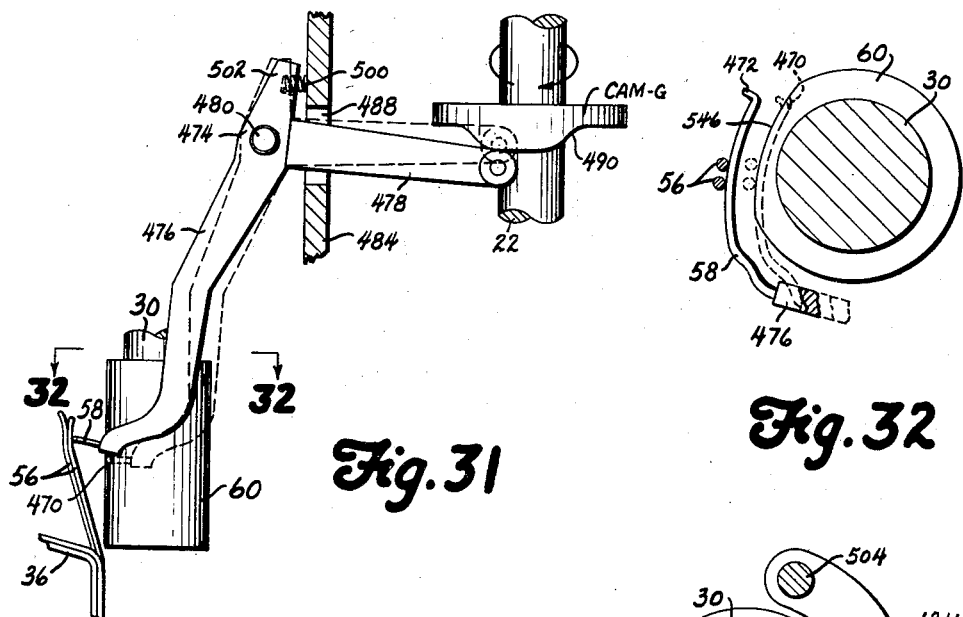
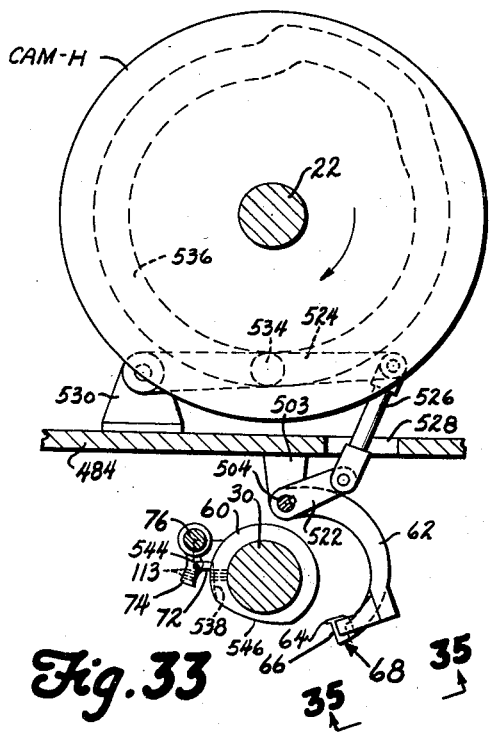
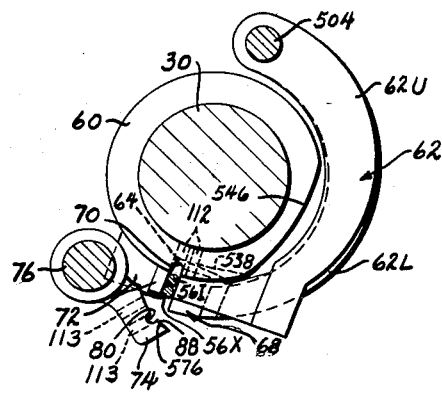
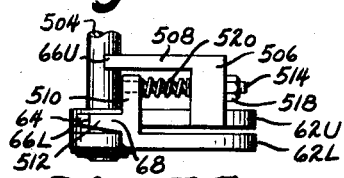
Fig. 31  Fig. 32  Fig. 33  Fig. 34  Fig. 35
INVENTOR.
Washington J. Caldwell

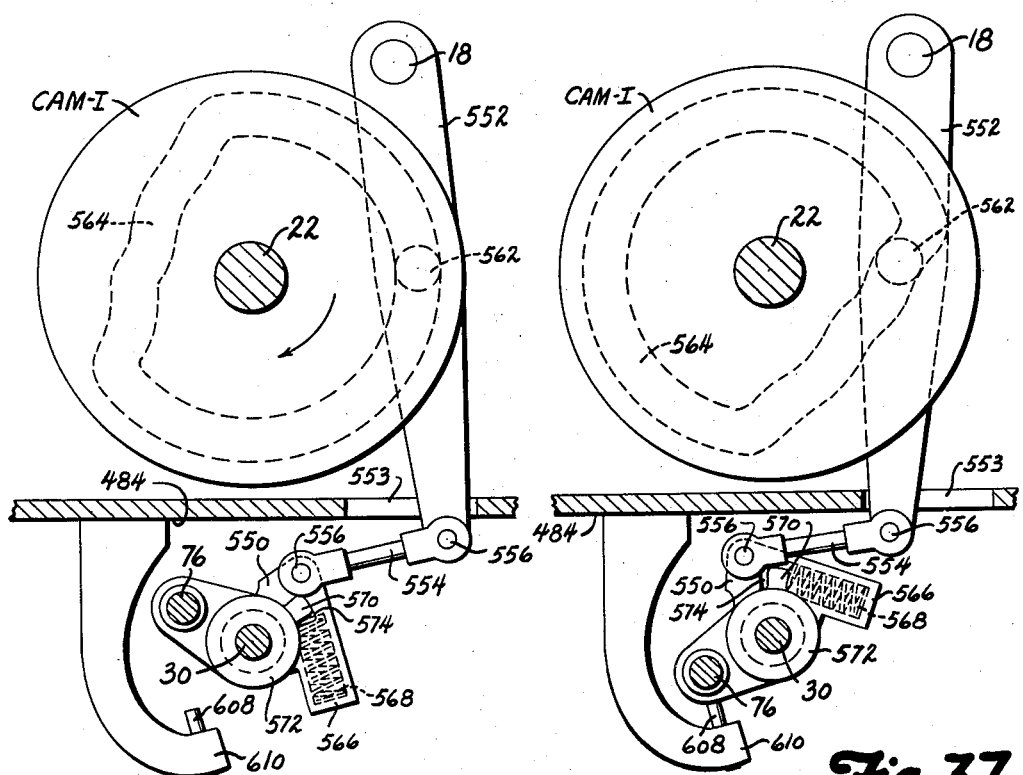
Fig. 36
Fig. 37
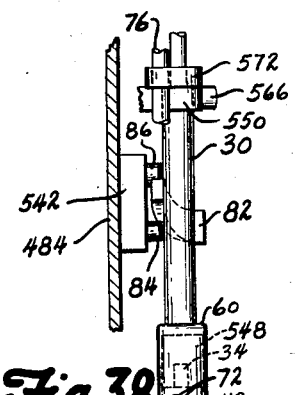
Fig. 38
Fig. 39
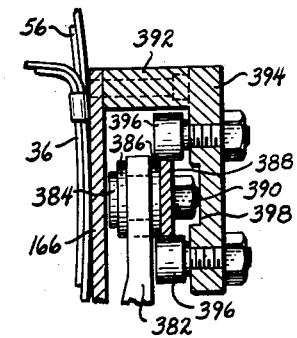
Fig. 12a
INVENTOR.
Washington J. Caldwell Jan. 13, 1959 W. J. CALDWELL 2,867,896
COIL INSERTING MACHINE FOR ARMATURES
Filed Feb. 9, 1954 15 Sheets-Sheet 10

INVENTOR.
Washington J. Caldwell
BY
Falvey, Souther & Stoltenberg

Jan. 13, 1959 W. J. CALDWELL 2,867,896
COIL INSERTING MACHINE FOR ARMATURES
Filed Feb. 9, 1954 15 Sheets—Sheet 11
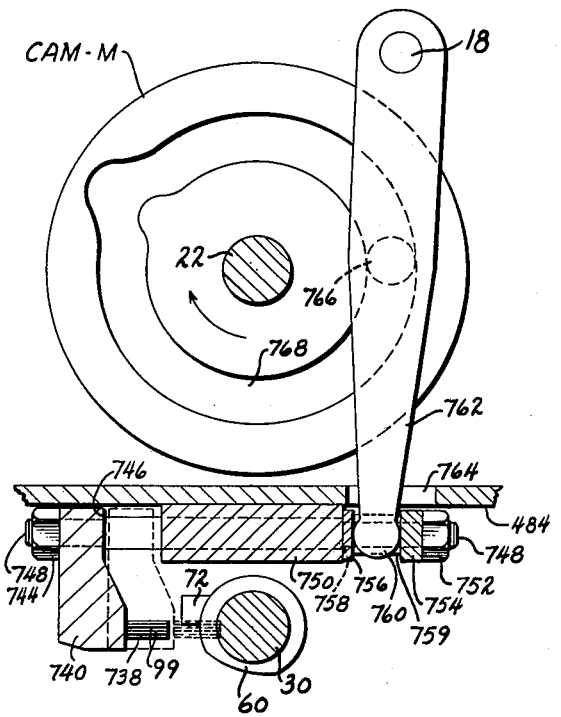
Fig. 47
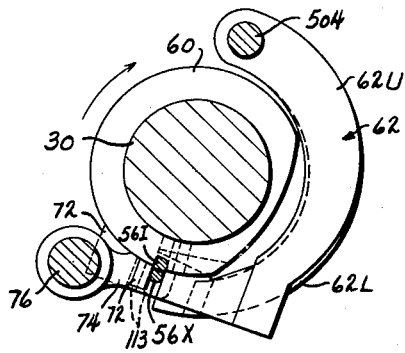
Fig. 44
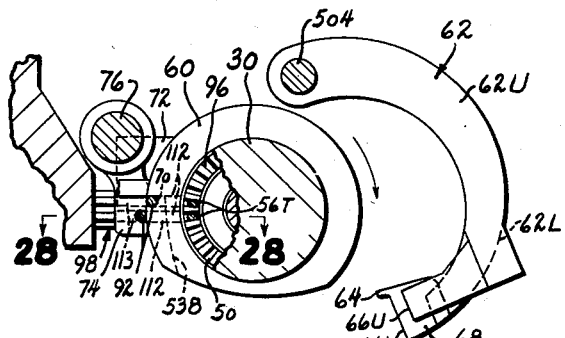
Fig. 46
Fig. 45
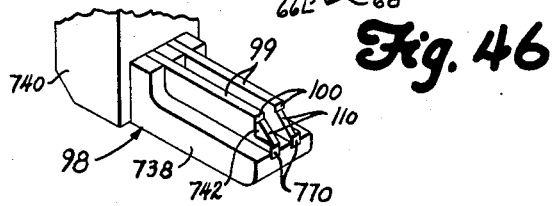
Fig. 48
INVENTOR.
Washington J. Caldwell
BY
Falvey, Souther & Stoltenberg INVENTOR.
Washington J. Caldwell INVENTOR.
Washington J. Caldwell

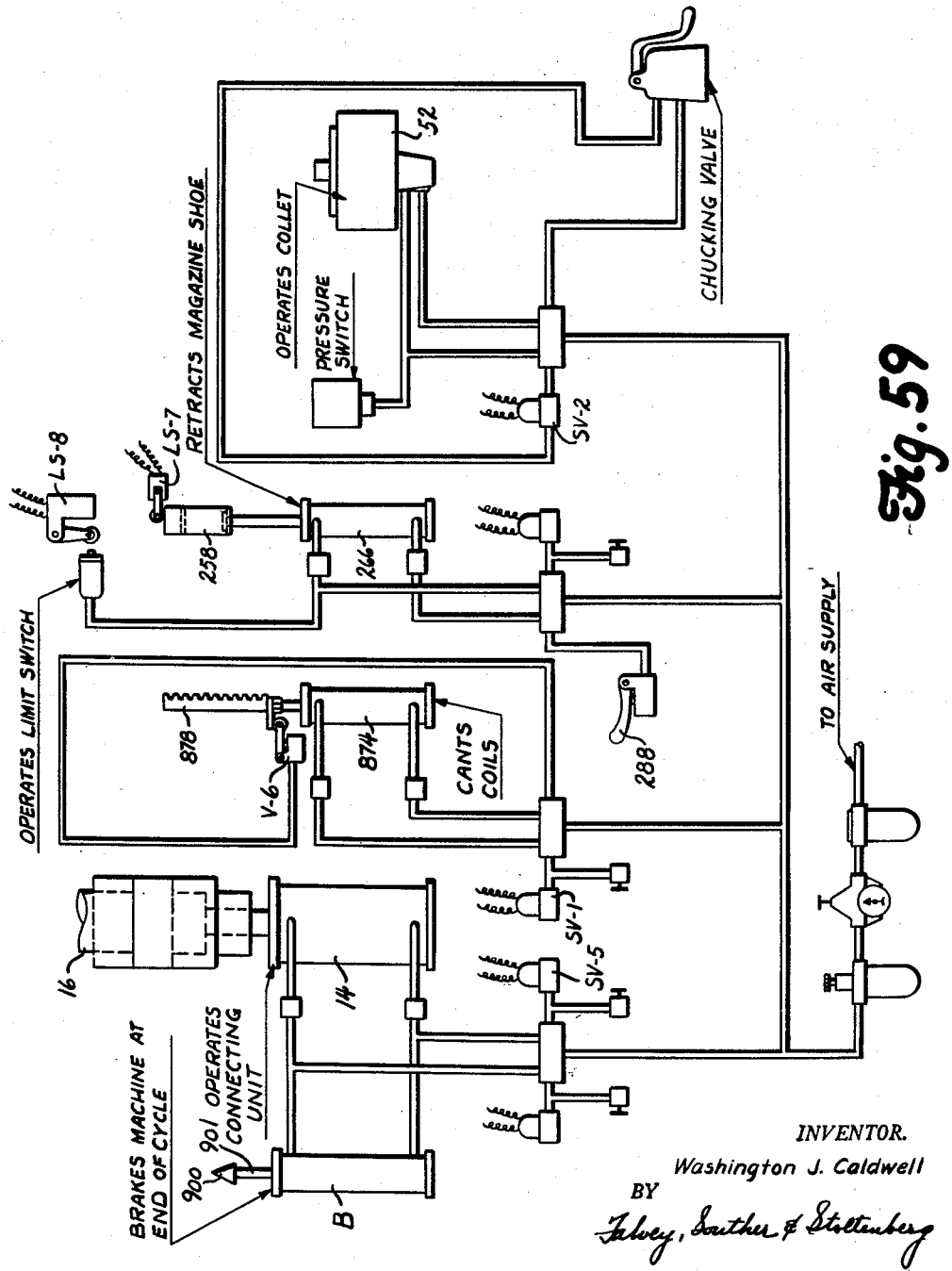

United States Patent Office 2,867,896
Patented Jan. 13, 1959

2,867,896

COIL INSERTING MACHINE FOR ARMATURES

Washington J. Caldwell, Toledo, Ohio

Application February 9, 1954, Serial No. 409,078

14 Claims. (Cl. 29—205)

This invention relates generally to a machine for the manufacture of dynamoelectric armatures comprising an assembly of a core, including a commutator, and a plurality of prewound, multi-wire armature coils. More particularly, the invention relates to an improved automatic machine for a step in the construction of such armatures whereby one side of each armature coil, the so-called bottom side, is positioned in a separate armature core slot and the individual leads of the bottom coil side, so positioned, are separated, rotated, and connected to the proper commutator segment.

This invention contemplates the provision of a machine which removes a double-wire prewound armature coil from the delivery end of a magazine-type coil-feeding unit and transports the coil to an armature core, including a commutator, where one side of the coil is positioned in a slot in the core. With the armature coil held securely in place, the machine proceeds to seize and separate the bottom two leads of the positioned coil side, holding them apart by an amount equal to the dimension between adjacent commutator slots and thereafter maintaining the separated relationship. The two leads are rotated about the centerline of the armature core to a predetermined position radially in line with their respective commutator slots, thus establishing the necessary angular relation of the commutator lead connection with regard to the coil side positioned in the core slot. The two leads are then trimmed to the correct length and pressed into their respective commutator slots, with which they have already been aligned. The machine repeats this cycle automatically until each core slot of the armature contains one coil side and one half of all the coil leads, or all of the "bottom" leads, are connected to the commutator. The human operator is required only for removing the partially constructed armature, positioning the next armature core in the machine, and maintaining the supply of prewound and formed armature coils in the coil-feeding magazine unit.

It is, therefore, a principal object of this invention to provide an automatic production machine for a step in the method of manufacturing armatures for dynamoelectric machines.

It is a further object of this invention to provide an automatic machine which cooperates with a magazine coil-feeding device and removes prewound coils singly therefrom and positions the coil by its bottom side into the slot of an armature coil and thereafter connects the bottom leads of the coil so positioned to a predetermined commutator bar or segment through a rotating and inserting device gripping the ends of the leads and cooperating with a slot in the commutator bar.

It is a further object of this invention to provide an automatic machine for a step in the manufacture of armatures for dynamoelectric machines which includes a magazine of prewound coils, wherein an element of the machine removes coils singly from the magazine and transports them, one at a time, to an armature core which is suitably indexed in the machine and inserts the bottom coil side in a core slot of the armature and another element of the machine separates and grips the bottom leads of the coil already inserted in the armature slot by its bottom side and rotates the leads until they are aligned with a predetermined commutator bar of the armature, where the leads are cut to length and inserted in a slot of the commutator bar, and other elements of the machine which cooperate with the already mentioned elements to make the machine operate automatically through an entire cycle necessary to complete the armature by inserting a coil side in each core slot and concurrently properly connecting the bottom leads of the coils to their predetermined commutator bars and thereafter automatically stopping the machine.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 3 is an elevational view schematically showing a portion of the driving, timing and operating parts positioned in the base of the machine;

Fig. 4 is an elevational view schematically showing the details of a parking cam and an air cylinder which positions a connecting unit;

Fig. 5 is an elevational view, partly in section, taken along line 5—5 of Fig. 56, of a working area surrounding a chucked armature core with an inserted and connected armature coil in final position thereon;

Fig. 6 is an elevational view in section taken along line 6—6 of Fig. 54;

Fig. 12a is a sectional elevational view taken along line 12A—12A in Fig. 12;

Figure 20:
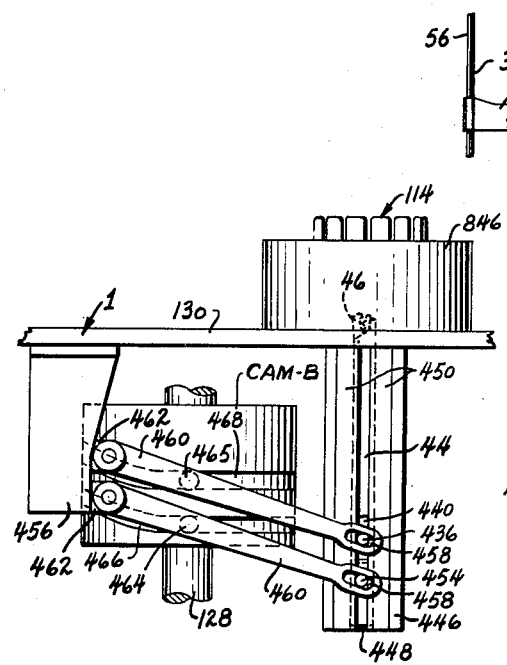
Figure 21:
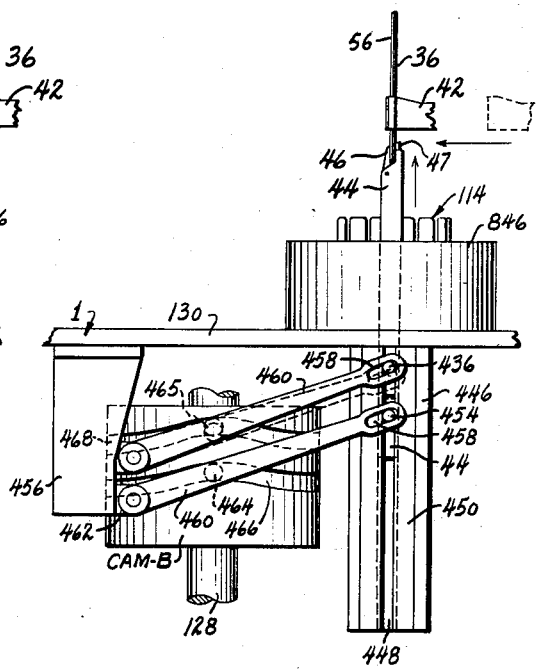
Figures 22, 23:
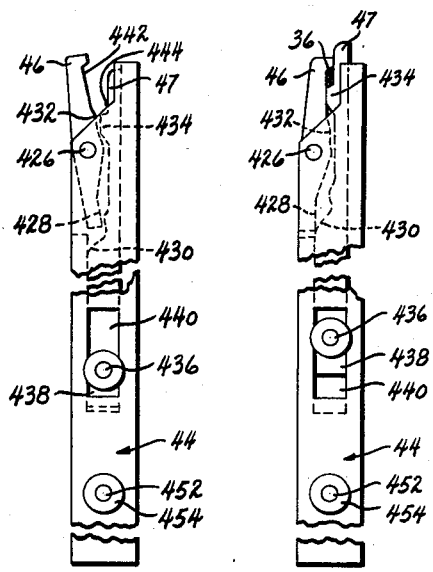
Figure 24:
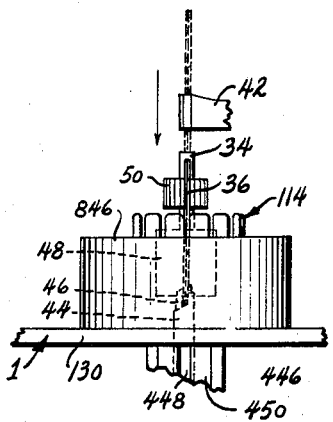

Figs. 14 through 19 inclusive illustrate progressive steps performed by various components of the coil feeding magazine in bringing an armature coil to a pre-inserted position, these figures being schematic plan views;

Figs. 20 and 21 are fragmentary elevational views illustrating operative positions of a coil-pull-down-arm with its coil gripping jaw;

Figs. 22 and 23 are enlarged fragmentary elevational views illustrating operative positions of the jaw on the coil-pull-down-arm shown in Figs. 20 and 21;

Fig. 24 is a fragmentary elevation showing the coil in its inserted position;

Fig. 25 is a side elevational view, partly in section, schematically illustrating a driving portion of the connecting unit of the machine;

Fig. 26 is a schematic front elevational view taken along line 26—26 in Fig. 25 showing an operating face;

Fig. 27 is a sectioned elevational view taken along line 28—28 of Fig. 46 adjacent the commutator of the armature;

Fig. 28 is the same as Fig. 27, except that a staking tool is shown at the end of its stroke.

Figure 40:
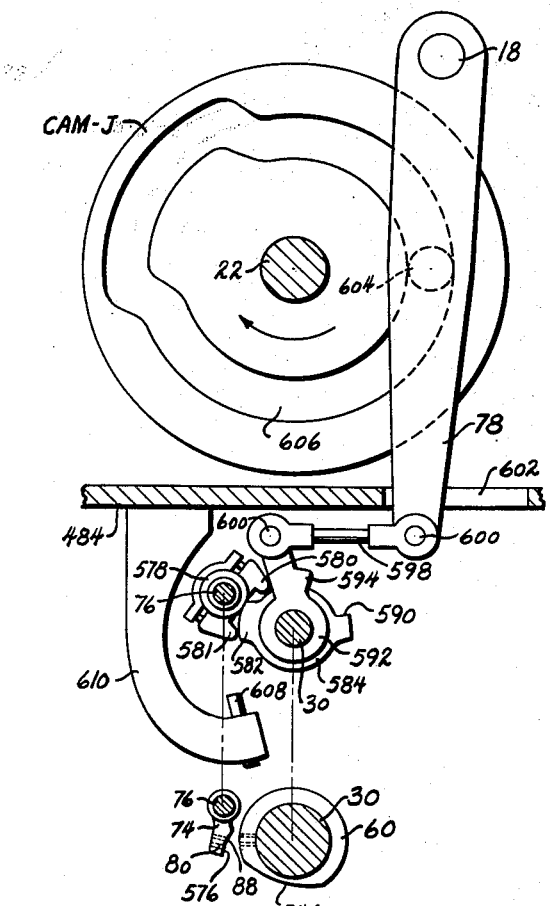
Figure 43:
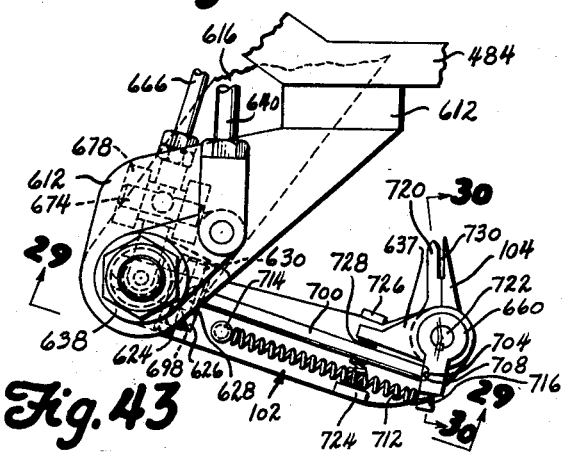
Figure 41:
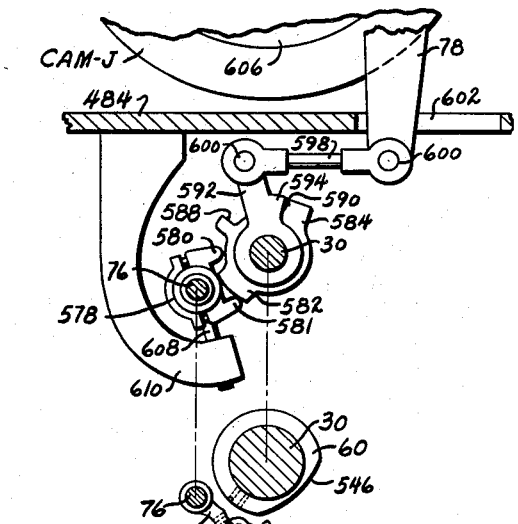
Figure 42:
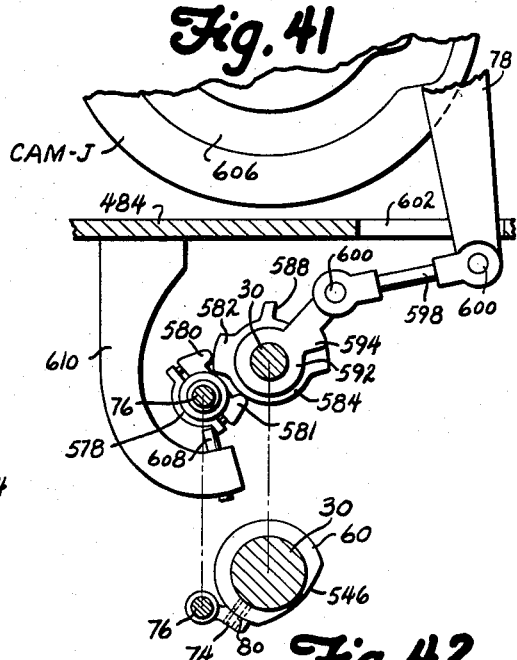
Figures 49, 50:
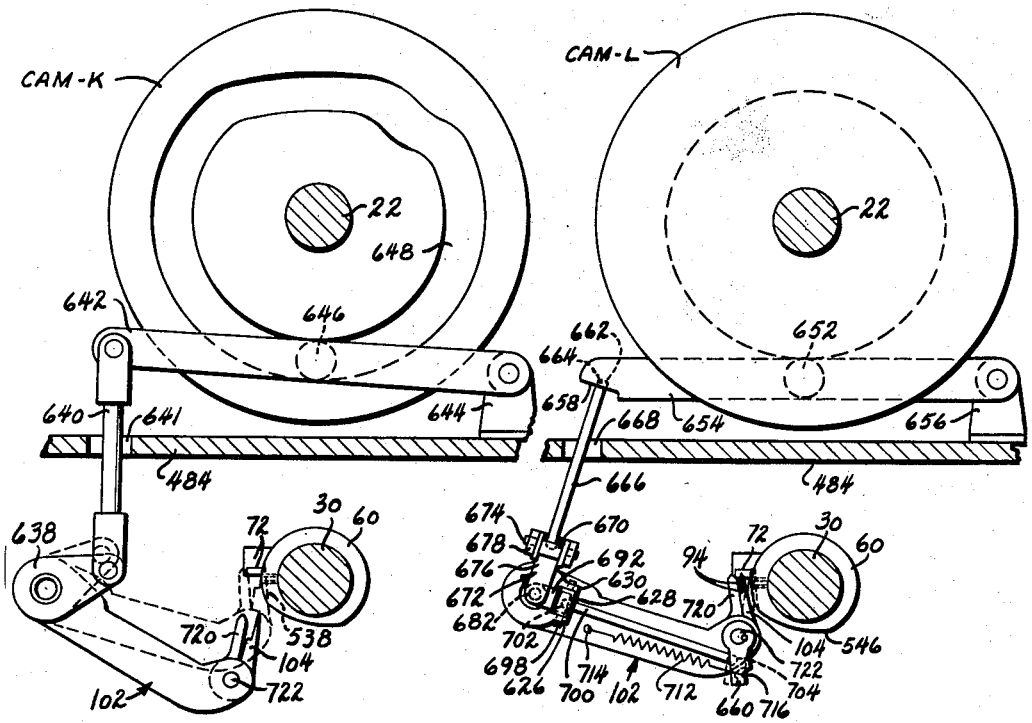
Figure 51:
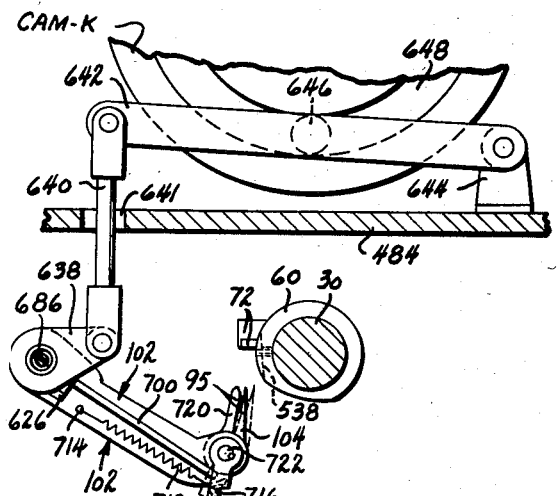
Figure 52:
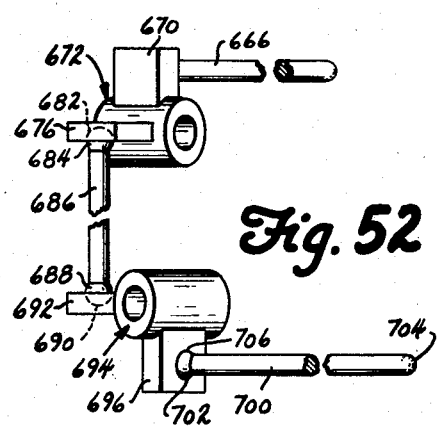
Figures 53, 56:
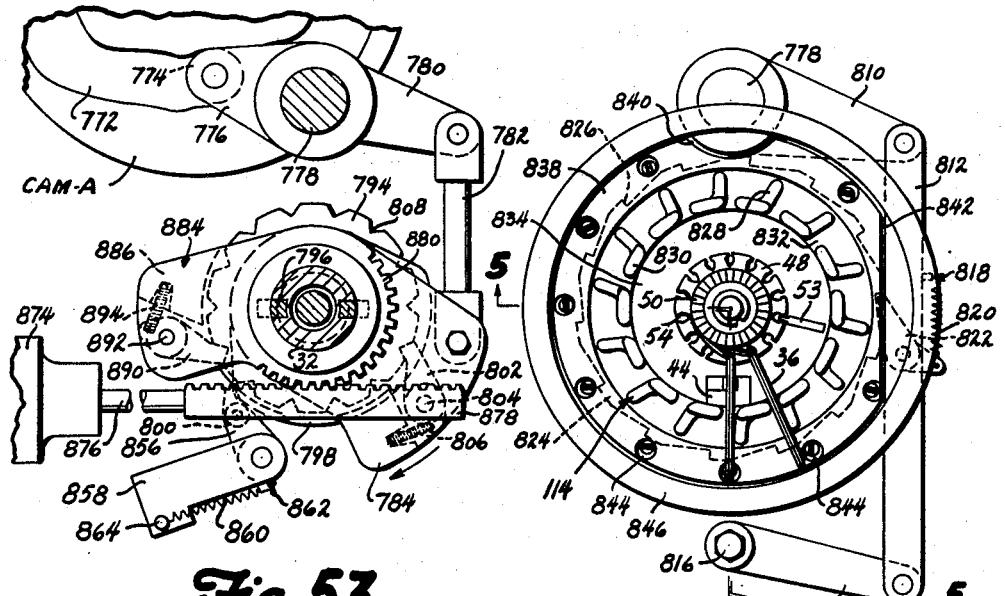
Figures 54, 57:
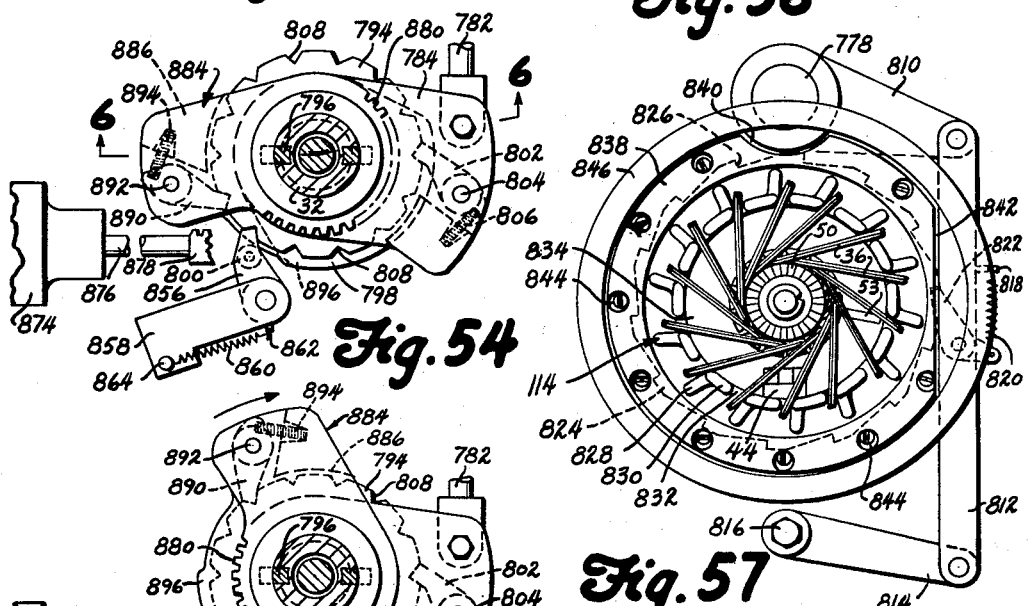
Figure 55:
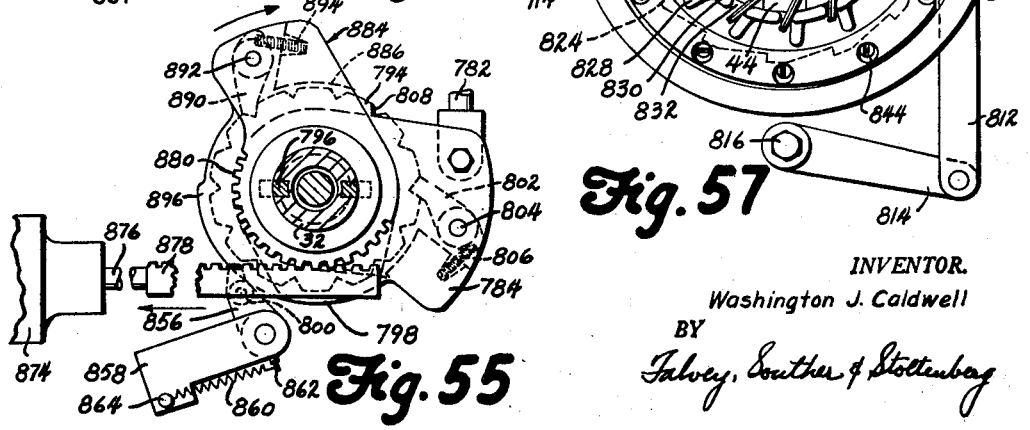
Figure 58:
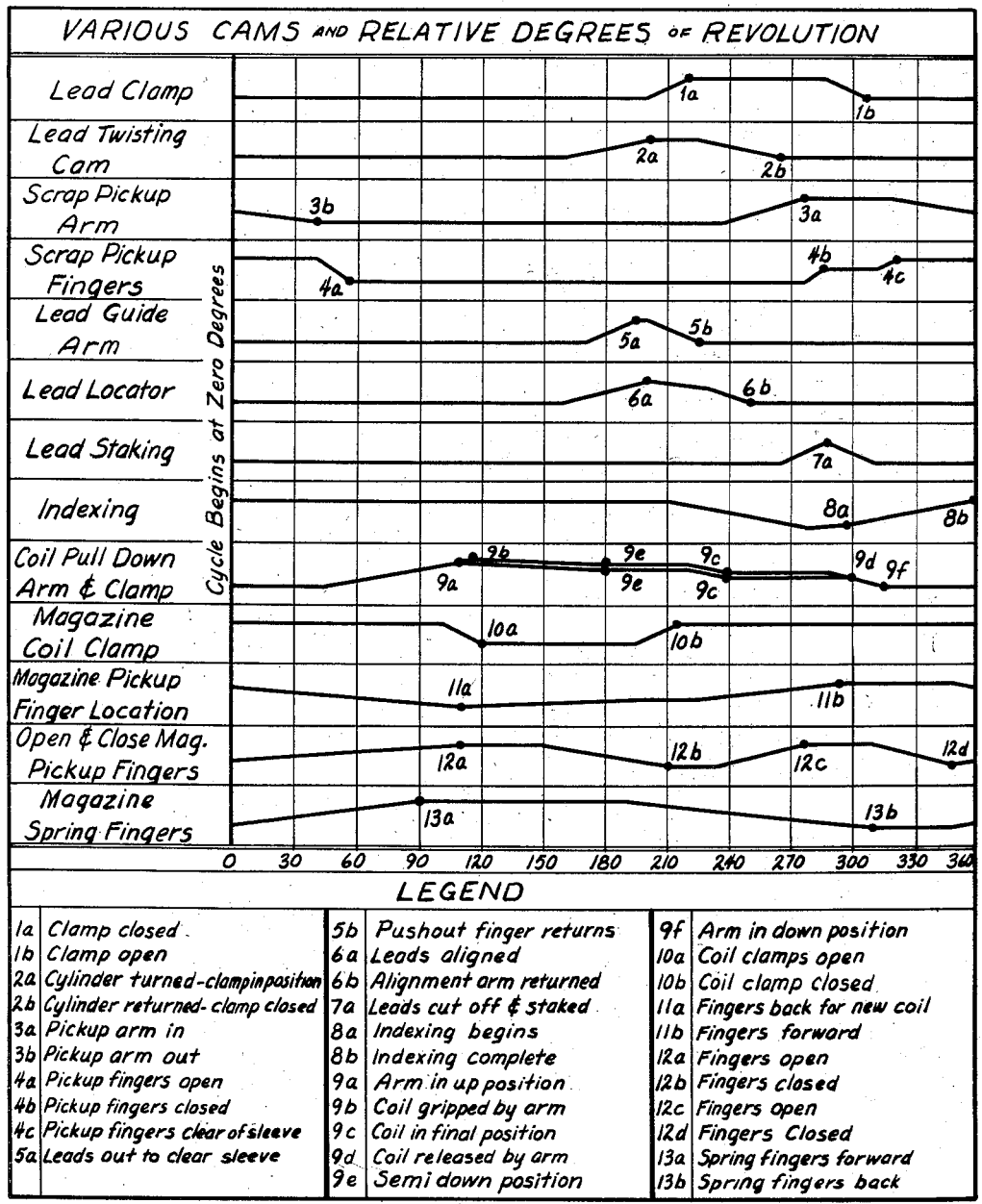

Fig. 29 is an elevational view, in the direction of line 29—29 of Fig. 43, illustrating a scrap arm mechanism with its gripping jaw;

Fig. 30 is an elevational view of a detail taken in section along line 30—30 of Fig. 43;

Fig. 31 is a side elevation of a lead guide mechanism;

Fig. 32 is an enlarged elevational view of a detail taken in section along line 32—32 of Fig. 31;

Fig. 33 is a fragmentary sectional plan view of a lead alignment mechanism;

Fig. 34 is an enlarged plan view, partly in section, of the relative position of various parts at a step in the process of aligning the leads;

Fig. 35 is an enlarged elevational view of a detail taken in the direction of the line 35—25 in Fig. 33;

Figs. 36 and 37 are plan views illustrating extreme positions taken by various members of a portion of a sleeve shaft mechanism, the views being fragmentary and partly in section;

Figs. 38 and 39 are fragmentary elevational views of various members of a portion of the sleeve shaft mechanism in the same extreme positions illustrated in Figs. 36 and 37;

Figs. 40, 41 and 42 are fragmentary plan views, partly in section, of various positions of upper portions of the sleeve shaft mechanism and a lead clamp mechanism. Directly below each principle figure appears another figure sectioned at a lower level on the said mechanisms to illustrate the relative positions of corresponding lower portions of the said mechanisms;

Fig. 43 is an enlarged, fragmentary plan view of a portion of a scrap arm mechanism with its jaw;

Fig. 44 is an enlarged plan view, partly in section, of the relative position of various parts when the leads are in aligned position;

Fig. 45 is the same as Fig. 44 except that the leads have been separated;

Fig. 46 is the same as Fig. 44 except that the leads have been separated and rotated to a position adjacent their commutator bar;

Fig. 47 is a plan view of a trimming and staking mechanism;

Fig. 48 is an enlarged perspective view of the trimming and staking tool;

Fig. 49 is a partially sectioned plan view of the scrap arm mechanism which illustrates the motion of the arm in phantom;

Fig. 50 is a fragmentary plan view, partially sectioned, of the scrap arm mechanism with its jaw in a closed position;

Fig. 51 is a view similar to Fig. 50 illustrating another closed position of the jaw of the scrap arm mechanism;

Fig. 52 is a fragmentary perspective view schematically illustrating a push rod system used in the scrap arm mechanism;

Figs. 53 through 55 are fragmentary plan views of operative positions of an indexing mechanism and a coil locking mechanism;

Fig. 56 is a fragmentary plan view of the working area, including a coil guide, portions of an indexing mechanism, a chucked armature core, and several inserted and connected coils in radial relation to the core;

Fig. 57 is similar to Fig. 56, except that the coils are shown in canted relation to the armature core and locked in place thereon;

Fig. 58 is a graphic representation of the timed relationship, of the various mechanisms and members of the machine;

Fig. 59 is a schematic diagram of the air pressure conduits showing important valves and electromagnetic control switches.

FUNCTIONAL DESCRIPTION OF MACHINE

Figure 1:
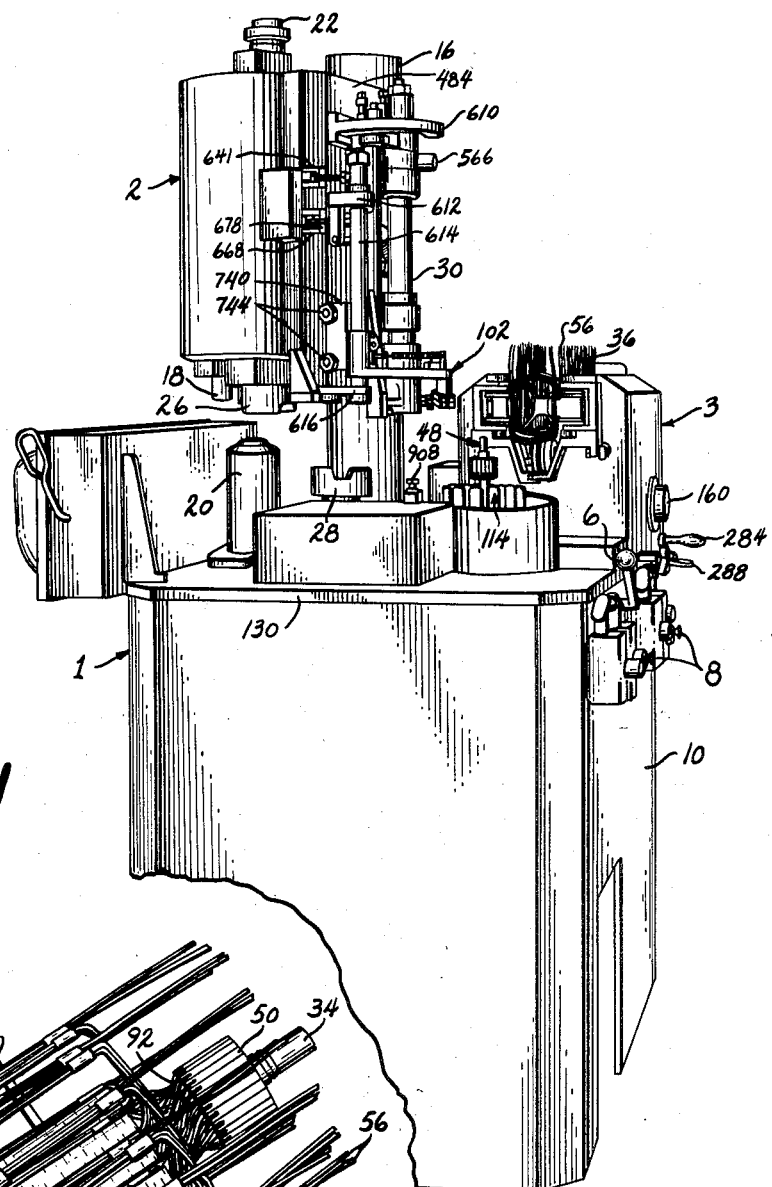
Fig. 1 is a perspective view of a machine embodying the invention.

Turning now to the drawings, Figure 1 illustrates a machine embodying a form of the invention. Generally, the machine comprises a base unit 1, a connecting unit 2 swung on a main support tube 16 by means of brackets 4 (Fig. 3), and a magazine unit 3 partially supported by and attached to the base unit 1. For purposes of clarity and to insure a better understanding of the invention and the machine, a brief summary of an operative cycle of the machine, with reference to the figures for illustration, will preface a detailed description of the various elemental mechanisms and parts.

Referring to Fig. 5, an armature core 48, consisting of a shaft 34, commutator 50, and laminated iron body 49 having insulated slots 54 and insulating end plates 55 is manually positioned in the machine by an operator, in a vertical position with the commutator end 50 upwardly, by placing the drive end of the armature core shaft 34 in an air-operated chuck 52 (initially in a released, open position), mounted on the upper end of a work shaft 32 affixed to the base unit of the machine. With the lower insulating end plate 55 resting on the upper end of the chuck 52, the operator first actuates a two position foot chucking valve (Fig. 59), then manually rotates the core shaft in the open chuck 52 to align any one of the slots 54 with a locating finger 53 (Figs. 56 and 57), and finally shifts a weighted control handle 6 (Fig. 1) to mechanically insert the locating finger 53 into the aligned slot 54. When the locating finger 53 has penetrated the aligned slot 54 to a predetermined position, a switch (not shown) is closed which actuates a solenoid valve SV–2 (Fig. 59) to close the air chuck 52 to securely hold the armature in the position shown in Fig. 1 and to close a pressure operated safety switch in the operating circuit. The operator again shifts the control handle 6 to withdraw the locator 53 from the aligned slot 54 and the return of the handle 6 to its starting position closes a second safety switch (not shown) in the operating circuit. After both safety switches have been closed, a machine cycle will be started when the operator simultaneously actuates manual switches 8 conveniently located at his left and right on a control panel 10 of the machine.

Upon initiation of the operating cycle, the lead connecting unit 2, mounted on the main support tube 16 affixed to the base unit 1, is rotated counterclockwise and lowered from a parked position, shown in Figure 1, to an operating position, shown in Figure 4, as a result of the combined action of a parking cam 12 and a parking air cylinder 14, both of which are also mounted on the main support tube 16. When the connecting unit 2 has rotated and lowered to the operating position, the lower end of a locating shaft 18, vertically mounted in depending position on the connecting unit 2, has been internally received in the bore of a locating shaft bearing 20, vertically supported by the base unit 1 (see Figure 1); a cam shaft 22, vertically journaled in the connecting unit 2, has been connected at its lower end to an upwardly projecting power shaft 24 rotatably mounted on the base unit 1 through engagement of two coupling elements 26 and 28 (see Figures 3 and 4); and a sleeve shaft 30, rotatably mounted on the connecting unit 2, has been concentrically aligned with the work shaft 32 of the base unit 1 and the armature core shaft 34 mounted in the air-operated chuck 52 affixed to the upper end of the work shaft 32 (see Figure 3).

Figure 11:
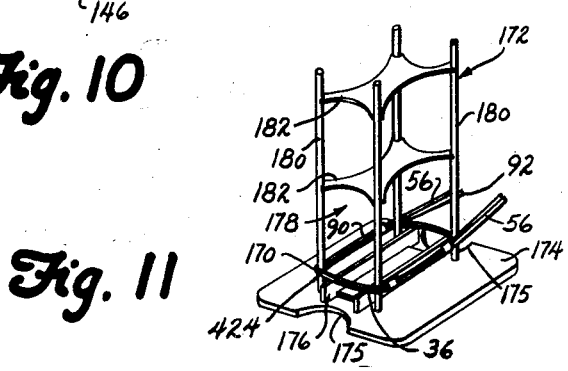
Fig. 11 is a perspective view of a magazine rack having an armature coil positioned thereon.
Figure 14:
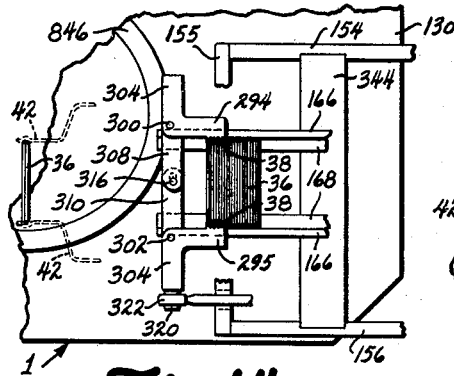
Figure 15:
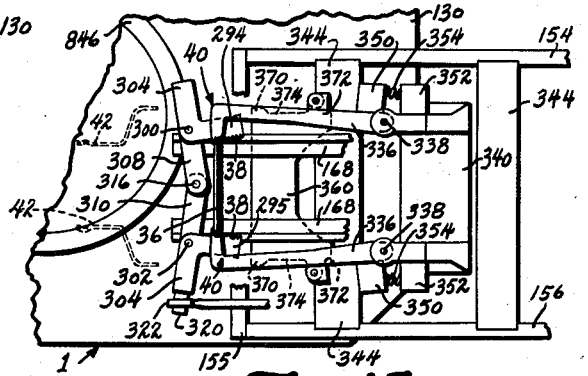
Figure 16:
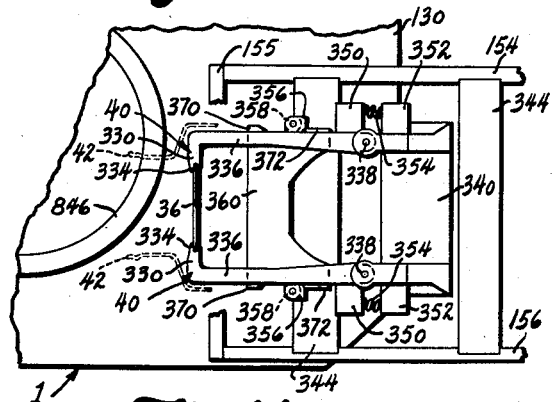
Figure 18:
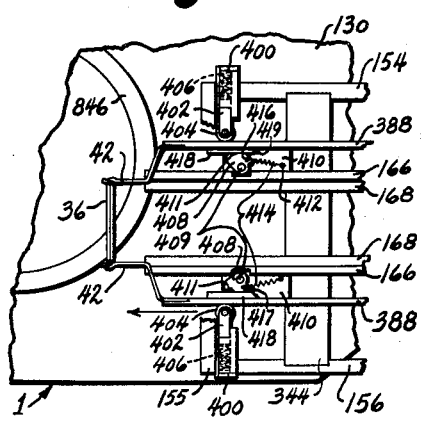
Figure 19:
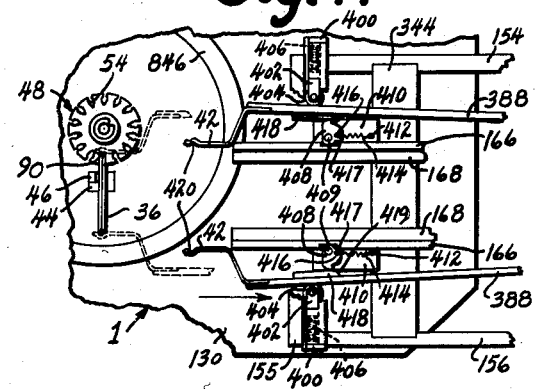

A prewound armature coil 36 taped to prevent unwinding, as illustrated in Figure 11, having coil leads 56 from the ends of which all insulation has been removed, is delivered to a pre-inserting position by the magazine unit 3, attached to the base unit 1, best seen in Figure 1. The magazine unit 3 mounts the armature coil 36, along with a plurality of similar coils on a formed holder 172 shown in Fig. 11. Under the pressure of a magazine tension system, shown in Fig. 8, the coils 36 advance through the magazine unit 3 toward the armature core 48 mounted in the air-operated chuck 52 (from right to left in Figs. 8 and 12), being spaced at the forward position by a magazine coil clamp 38, clearly pictured in Fig. 14. The individual coil 36 is ultimately grasped by a pair of magazine pickup fingers 40, as shown in Figs. 15 and 16, and delivered to a pair of magazine spring fingers 42, illustrated in Figs. 17 and 18, for delivery by the latter (42) to the pre-inserting position, in which the "bottom" coil side 90 is vertically above, and longitudinally aligned with, a vertically oriented core slot 54 in the armature core 48 held by the air-operated chuck 52, as can be seen in Fig. 19.

The inserting sequence of the cycle is clearly illustrated in Figs. 20 through 24. Positioning the coil 36 in the armature core slot 54 is a function of a coil-pull-down arm 44 and its jaw 46, which cooperate to grasp the coil 36 by its bottom side 424 (Fig. 11) and pull it downwardly from the grip of the spring fingers 42 into the core slot 54 to a semi-inserted poistion and, later, to an inserted position therein. It should be understood that the coil side 90 (Fig. 19) travels longitudinally into and through the core slot 54 in its movement to the inserted position. The coil-pull-down arm 44 and its jaw 46 hold the coil 36 in the semi-inserted and inserted positions through the lead connecting phase of the cycle.

In the description of the lead connecting phase of the machine cycle reference may be had to Fig. 26, which illustrates an operating face 484 of the connecting unit 2, and to Figs. 31 through 48 which disclose the various details of the mechanism. With the coil 36 pulled down and held in the semi-inserted position, the two "bottom" coil leads 56 (Fig. 11) to be connected to the commutator are pushed away from a sleeve 60 of the connecting unit 2 by a lead guide 58 in a manner best shown in Figs. 31 and 32. A lead alignment arm 62 of the connecting unit 2 is immediately brought to the position illustrated in Fig. 34, with a toe 64 of a lead alignment block 68 (Fig. 33), detailed in Fig. 35, initially stationed between the sleeve 60 and the coil leads 56 as a guide, finally being aligned with a recess 70 in the sleeve 60 which is rotated in a counterclockwise direction to cooperate with arm 62 (Figs. 33 and 34). Simultaneously, a face 66 of the lead alignment block 68 contacts the leads 56 adjacent the body of the coil 36 and urges the leads 56 against two vertically aligned lead stops 72 on the sleeve 60, by their relative rotation toward each other. A lead clamp 74, positioned on rotatable shaft 76 cooperating with shaft 30, swings to a position adjacent the leads 56 to grasp and clamp them, which position is also shown to best advantage in Fig. 46. The movement of the lead stops 72 and the lead clamp 74 to the positions indicated, is traceable to counterclockwise rotation of a sleeve shaft 30 and counterclockwise rotation about the sleeve shaft 30 of a lead clamp shaft 76, respectively. The rotation in both cases originates in a sleeve shaft cam I and connecting linkages which are clearly shown in Figs. 36 and 37 and will be more fully disclosed hereinafter.

Through a suitable cam mechanism to be further described hereinafter, lever 78, shown in Fig. 40, closes the lead clamp 74 by moving said clamp 74 to a position against an outer surface of the sleeve 60, as shown in Figs. 41 and 42, and the leads 56 (Fig. 44) to be connected to the commutator are thereby urged radially toward the center line of the sleeve shaft 30 by the lead clamp 74. The result of the radial pressure is that the innermost lead 56I, or the lead nearest the center line of the sleeve shaft 30, is caused to nestle in the recess 70 in the sleeve wall 60, while the outer lead 56X is embraced by a recess 80 in a face 88 of the lead clamp 74. Both recesses, 70 and 80, are clearly shown in Fig. 34. Figure 44 shows the lead clamp 74 in the closed position and the leads 56I and 56X, firmly held in place in their respective recesses. At this point the coil-pull-down arm 44 lowers the coil 36 to the inserted position.

Figure 2:
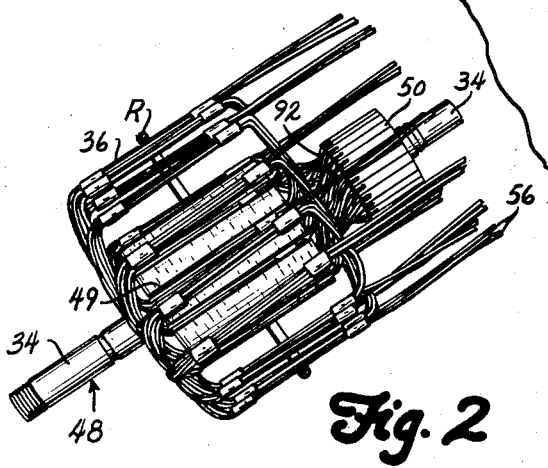
Fig. 2 is an elevation of a partially constructed armature, the product issuing from the machine here disclosed.

A comparison of Figures 38 and 39 will reveal that when the sleeve shaft 30 was rotated, it was raised by the interaction of a sleeve shaft strip cam 82, attached to the sleeve shaft 30, and a lower relatively fixed roller 84 rotatably mounted on a block 542 affixed on the face 484 (Fig. 26) of the connecting unit. Since the lead clamp shaft 76 is mounted in parallel relation on the sleeve shaft 30, by means to be explained later, the lead clamp 74 was similarly raised and the final clamping action of the lead clamp 74, illustrated in Fig. 44, occurred at the outer end portions 92 (Fig. 2) of the two coil leads 56 free of insulation. Fig. 26 best reveals the relative position of the parts mentioned.

The direction of rotation of the sleeve shaft 30 is now reversed by action of the sleeve shaft face cam I, its follower and linkage. Through a lost motion mechanism, to be described hereinafter, the sleeve shaft 30 rotates clockwise through an arc equal to $\frac{1}{28}$ of a revolution before the lead clamp shaft 76 moves, which, in the interim, has been stationary. At the periphery of the sleeve 60 this relative rotation separates the lead ends held in the recesses 70 and 80 by a distance approximately equal to the distance between adjacent commutator slots 96, so that the leads 56 are correctly spaced, both with regard to each other and to the slots in the commutator 50 on the armature core 48 held by the air chuck 52 in a manner best illustrated in Figs. 45 and 46. The lead alignment arm 62 is now retracted to its starting position. Simultaneously, the sleeve shaft 30 is rotated clockwise and returned to its original position. Since the lead clamp 74 is rotated clockwise in a closed position with the sleeve shaft 30 after the initial relative rotation, the lead ends 92 are locked in their respective recesses 70 and 80 (Fig. 34), the inner lead 56I in the sleeve recess 70 being held in place by the face 88 of the lead clamp 74, while the outer lead 56X in the lead clamp recess 80 is held in place by the periphery of the sleeve 60. Completion of the sleeve shaft 30 cycle of rotation to its initial position, best shown in Fig. 46, accomplishes:

(1) Correct angular rotation of the coil leads 56 with regard to their coil side 90 inserted in the core slot 54 in the armature core 48;

(2) A lowering of the end portions 92 of the coil leads to the level of the slots in the commutator 50 on the armature core 48 in the air chuck 52; and (3) Approximate radial alignment of each of the end portions 92 of the two coil leads 56I and 56X with its particular commutator slot 96 through its own trim and guide slot 112 in the sleeve 60.

Figs. 29, 30, 43 and 49 through 52 disclose the steps in the operation of a scrap arm 102 with its gripping jaws 104 and 720, the front jaw 104 being rotatably mounted on, and caused to cooperate with the latter jaw 720, which is also mounted on the arm 102. The arm 102 is mounted on the connecting unit 2. The front jaw 104 is carried in an open attitude by the scrap arm 102 from an initial position to a position within a transverse groove 538 (Fig. 49) of the sleeve 60, so that the lead extremities 94 are between the front jaw 104 and the cooperating back jaw 720. The front jaw 104 is positively urged toward the back jaw 720 by a mechanism to be described hereinafter thus closing the jaws and firmly but resiliently grasping the extremities 94 of the two coil leads 56 in the manner shown in Fig. 50. These tip ends of the leads are subsequently cut off and then removed by this mechanism.

A connecting tool 98 slideably mounted on the connecting unit 2 (shown in Fig. 48) moves radially inwardly with respect to the sleeve shaft 30, as shown in Fig. 47, and each of the two staking tool blades 99, mounted on the connecting tool 98 pass through a trim and guide slot 112 (Figs. 45 and 46) in the sleeve 60 to accomplish the coil lead staking in the commutator slots. The excessive length 56E of the coil leads 56 is cut off by shearing action of the trim portions 100 (Fig. 48) of the staking tool blades 99 and the closed ends of the trim and guide slots 112, prior to the actual staking of the leads 56 into the commutator slots 96. This action is clearly illustrated in Figs. 27 and 28.

With the "bottom" leads of the coil properly connected in the commutator, the machine now executes preparatory motions necessary to position the various machine elements for automatic repetition of the cycle which will pull the next coil side into the next adjacent core slot and connect its bottom leads to the commutator. Figs. 53 thru 57 disclose the details of an indexing mechanism, which rotates a slotted coil guide assembly 114 mounted on the base unit 1, (Fig. 1) the work shaft 32 on which it is mounted and the armature core 48 through such an arc that the next adjacent empty core slot 54 is positioned to receive the next coil 36 from the magazine unit 3. Meanwhile, the just connected coil 36 is release by the coil-pull-down jaw 46 and the coil-pull-down arm 44 is lowered still further to avoid interference with the indexing mechanism. The lead clamp 74 of the connecting unit 2 is opened and returned to its original position, while the scrap arm 102 on the connecting unit 2 moves back to its initial position to deliver the severed lead scrap wire 56E to a scrap chute where, at the start of the next cycle, the scrap jaw 104 is opened and the scrap wire will be released. A new cycle then begins, going through the same steps, as already described.

After fourteen coil sides 90 have been inserted in core slots 54 of the armature core 48 and their twenty-eight corresponding leads 56 have been connected to the commutator 50, the connecting unit 2 automatically returns to the parked position from which it started, as shown in Fig. 1, and the armature core 48, still held by the air-operated chuck 52 is rotated with reference to the slotted coil guide 114, the latter guide 114 restraining the uninserted coil sides to such an extent that a canted relation between the armature coils 36 and armature core 48 is achieved, which longitudinally locks the coils 36 in place on the core 48. A retaining ring R is assembled to the partially constructed armature by the operator for the purpose of retaining the coils 36 radially in place on the core 48. See Fig. 2.

The foot chucking valve is now activated by the operator to open the air chuck 52 and the entire assembly, with locking ring in place, is removed from the machine by the operator, who disposes of it in an appropriate fashion.

In this particular instance, such disposition could be made to another automatic machine of the type for which patent application, Serial No. 192,189 was filed October 26, 1950, by W. Caldwell now Patent No. 2,703,-293, for the insertion of the second or "upper" coil sides into the core slots.

DRIVE MECHANISM

Referring to Fig. 3, an electric motor 116 or other satisfactory primary power source is provided to drive, by means of a belt 118, a pulley 120, thereby actuating a conventional gear train 122. The gear train 122 revolves a gear 124 which meshes with and rotates another gear 126 of the same size and construction, so that both gears 124 and 126 will rotate together at the same speed. The gears 124 and 126 are fixedly mounted on two vertical shafts, a drive shaft 128 and a power shaft 24 respectively, in parallel juxaposition within the base unit 1, journaled in the conventional manner in bearings (not shown) positioned in a top plate 130 and a mounting plate 132 of the base unit 1. The upper end of the power shaft 24 is provided with a coupling element 28 secured thereto, while a face cam A, to be described later, is concentrically attached to the power shaft 24 below the mounting plate 132. The drive shaft 128 is journaled in the conventional manner in bearings (not shown) supported by the lower mounting plate 132 and the top plate 130 of the base unit 1. A drum cam B, the function of which will be described later is secured to the drive shaft 128 below the top plate 130 while a driving bevel gear 134 and a timing gear 136 are fastened to an upper end of the drive shaft 128 above the plate 130 being also enclosed in a housing 138 secured to the top of the top plate 130. A bevel pinion 140 meshes with the bevel gear 134 inside the housing 138 and is mounted on the end of a horizontal counter shaft 142 rotatably supported by bearings (not shown) in a side wall of the housing 138 and in a wall 145 of a gear box 144 attached to a side of a lower housing 158 of the magazine unit 3, as will be described later.

Coil feeding magazine unit

A magazine unit 3 (Fig. 7) is provided for the machine, the main function of which is to receive a plurality of prewound, multi-wire, armature coils 36, having their leads 56 projecting upwardly in a vertical direction, and to deliver individual armature coils 36, in a timed sequence, to a pre-inserted position from which the coil 36 may be transported vertically downward to an inserted position in a slot 54 (Fig. 19) of an armature core 48 held by an air-operated chuck 52 mounted on a base unit 1.

Figure 7:
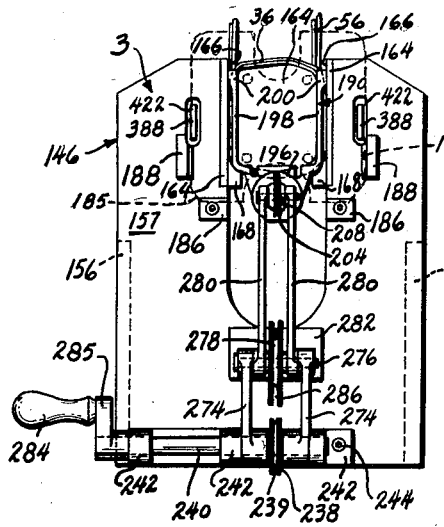
Fig. 7 is a rear elevational view in the direction of line 7—7 in Fig. 12 of the upper housing of a coil-feeding magazine having an armature coil positioned thereon.
Figure 8:
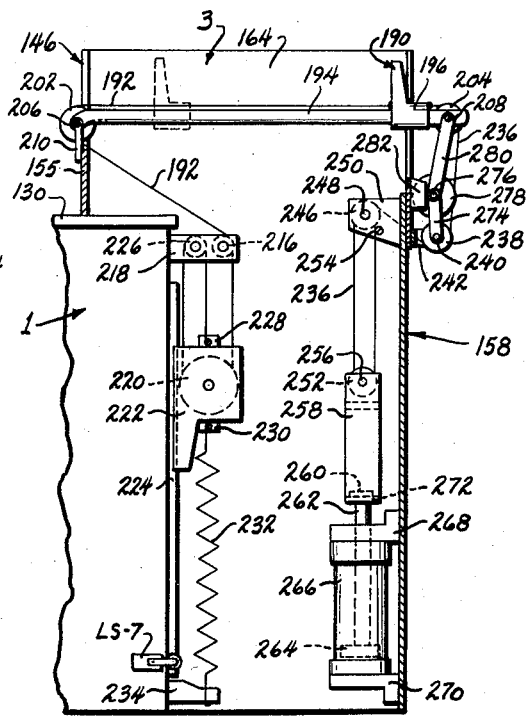
Fig. 8 is a side elevational view schematically illustrating a tension control system employed in the coil feeding magazine.

The magazine unit 3 of the machine is enclosed in two main connected housings 146 and 158 (Fig. 8), vertically related, forming one shell, situated adjacent the base unit 1 of the machine. For purposes of clarity in the following description of the magazine unit, the adjective "front" will be used to designate a portion of the magazine unit 3 closest to the base unit 1, while "rear" is intended to describe a portion of the magazine unit 3 farthest removed from the base unit 1. The lower housing 158, being vertically oriented, is attached to a side of the base unit 1 in an appropriate manner and is self-supporting. The upper housing 146 is horizontally oriented and is partially supported by the lower housing 158, but extends over the top of the base unit 1 and is suitably attached to a top plate 130 of the base unit 1 (Fig. 8). The upper housing 146 contains a horizontal, longitudinal coil channel 164 having two vertical sides 166 (Fig. 7), each supporting a horizontal, longitudinal rib 168, the upper and inner sides of which are cut away and contoured to conform to the shape of the corners 170 (Fig. 11) adjacent the closed side of the armature coil 36. The coil channel 164 is disposed in the upper housing 146 to direct the armature coils 36 toward the pre-inserted position and is of sufficient size to receive a plurality of armature coils 36 mounted on a coil rack 172 (Fig. 11).

The coil rack 172 comprises a base plate 174, provided with clearance indentations 175, supporting an attached pressure shoe spacer 176 and a trunk 178, consisting of four parallel rods 180 mounted perpendicularly on the base plate 174, strengthened by appropriate internal bracing members 182, and enclosing a rectangular cross-sectional area of slightly smaller size than the quadrilateral formed by the wire turns of the armature coil 36. The trunk rod 180 ends opposite the base plate 174 are convergingly chamfered or formed, thereby facilitating removal of the coils 36 from the delivery or open end of the rack trunk 178. During prior processing, a multiplicity of prewound armature coils 36, having leads 56, the ends of which are bare of insulation, are arranged on the coil rack trunk 178, with all the coil leads 56 projecting in the same direction in parallel relation with the indentations 175. The coils 36 are restrained from revolving on the trunk 178 or changing position, by the rectangular shape of the trunk 178 within the quadrangular area of the coil center.

An operator manually positions a plurality of armature coils 36, mounted on a coil rack 172 in the aforementioned manner, in the coil channel 164 of the upper housing 146 of the magazine unit 3, with all the uninsulated coil leads 56 projecting in an upwardly direction and the open end of the rack 172 directed toward the machine so that the coils 36 may be removed singly from the magazine-like coil rack 172 and fed to the pre-inserted coil position (Figs. 1, 12 to 14). The assembly of the rack 172 and the coils 36 is firmly supported in a horizontal position in the coil channel 164, since the coil corners 170 adjacent the closed coil side rest on the contoured portions of the longitudinal ribs 168 in the channel 164. The base plate 174 of the rack 172 is independently supported outside the coil channel 164, resting in broad slots 185 in two retaining lugs 186 fixed to the outside of the rear wall of the upper housing 146 of the magazine unit (Fig. 7). The slots 185 in the retaining lugs 186 also serve to restrict the longitudinal movement of the coil rack trunk 178 within the coil channel 164 by limiting the longitudinal movement of the rack base plate 174 to approximately the normal thickness of one armature coil 36. Two rearwardly extending locating blocks 188, one being affixed to the outside of the rear wall of the upper housing 146 of the magazine unit 3 on each side of the rack base plate 174, serve to restrict the lateral movement of the rack 172 within the coil channel 164.

By manually operating a shoe switching mechanism, shown in Figs. 8 and 9, and which will be described later, the operator causes a vertical U-shaped pressure shoe 190 to be positioned behind the bottom coil 36 adjacent the base plate 174 on the rack trunk 178 by being inserted in the space provided for it by spacers 176 between the base plate 174 (Fig. 11) and the adjacent armature coil 36 mounted on the trunk 178 of the coil rack 172. The pressure shoe 190 capable of being moved horizontally parallel to the rack trunk 178 and bearing against the flat side of the adjacent armature coil 36, is pulled toward the open end 184 of the trunk 178 by a tension member 192, thereby tending to move the coils 36 from the rack trunk 178 toward the machine, and thereby compresses the coils 36 against coil manipulating and separating mechanisms which are designed to separate the coils and feed them individually to a position where they are to be inserted into the armature which is to be described later. These mechanisms are located at the open end of the rack when it is in operative position in the machine.

Referring to Figs. 7 to 11 inclusive, the tension member 192 adapted to move the shoe 190, which may be any suitable wire, cord, line or cable, is attached to the front end of the pressure shoe 190 slideably mounted on a round shoe rod 194 by means of a single, centralized bearing 196 integral with the shoe 190. To prevent binding of the shoe bearing 196 on the shoe rod 194, the shoe carries a key received in a conventional manner by a longitudinal keyway 197 in the top of the shoe rod 194. To further align the shoe 190 with the coil channel 164, each of two vertical leg members 198 of the U-shaped coil contacting surface of the shoe 190 is provided with an outwardly extending ear 200 (Fig. 7), thereby allowing the vertical sides 166 of the coil channel 164 to serve as guides for the longitudinally movable shoe 190. The shoe rod 194 length is greater than the length of the coil channel 164 and the ends of the shoe rod 194 protruding from the front and rear walls of the upper housing 146 of the magazine unit 3 are bifurcated to vertically receive a front sheave 202 and the rear sheave 204. Both sheaves 202 and 204 are rotatably mounted in the ends of the shoe rod 194 on horizontal shafts 206 and 208. The shaft 206 rotatably supporting the front rod sheave 202 is also journaled in a bracket 210 affixed to the front wall 155 of the upper housing 146 by appropriate means, as screws 212, and provides an axis, about which the shoe rod 194 pivots in a vertical plane. In a normal operating position, the shoe rod 194 is locked in a horizontal position below and between the longitudinal ribs 168 at the bottom of the coil channel 164 by means to be described later. The front end of the shoe rod 194 is bent downwardly (Fig. 8) to provide clearance for various finger mechanisms, also to be later described, active at the front, or delivery, end of the coil channel 164.

The cable tension member 192 (Fig. 8) extending horizontally from the front of the shoe 190 in a forwardly direction engages the upper side of the front sheave 202 and proceeds in an oblique rearwardly and downwardly direction to a rear pulley 216 rotatably mounted in a vertical plane on a pulley support bracket 218 attached to the side wall of the base unit 1 within the lower housing 158 of the magazine unit 3. From the rear pulley 216, the tension member 192 extends downwardly in a vertical direction around a spring pulley 220 rotatably mounted in a spring actuated slide 222 movably attached to guide ways 224 mounted vertically on the side wall of the base unit 1 inside the lower housing 158. Proceeding in a vertical direction upwardly, the tension member 192 is positioned about another pulley 226 to turn through another 180 degrees, the pulley 226 also rotatably mounted on the pulley support bracket 218. The end of the tension member 192 then proceeds vertically downward to a terminus at a slide lug 228, to which it is securely fastened. The slide lug 228 is attached to a top side of the spring slide 222 which also carries on a bottom side thereof, a spring lug 230, retaining one end of a coil spring 232 stretched downwardly and secured to a spring stud 234 rigidly projecting from the side of the base unit 1 inside the lower housing 158 of the magazine unit 3.

As the spring actuated slide 222 moves downwardly in the vertical ways 224 under the bias of the coil spring 232, the tension member 192 follows and exerts a pull on the shoe 190, thereby urging the coils 36 toward the open end of the rack trunk 178 at the delivery end of the coil channel 164 of the magazine unit 3.

A tension relief member 236, being a suitable wire, cord, line or cable, is attached to the rear end of the pressure shoe 190 and extends on a horizontal, rearwardly direction over the rear rod sheave 204, which directs the tension relief member 236 downwardly where it extends obliquely to cooperate with a crank sheave 238 rotatably mounted on a horizontal crank shaft 240 (Fig. 7) journaled in a mounting bracket 242 affixed to the outside of the rear wall of the lower housing 158 of the magazine unit 3 by means of screws 244. Extending obliquely in an upwardly direction, the tension relief member 236 proceeds through the wall of housing 158 to a terminal sheave 246 mounted to revolve freely in a vertical plane on a horizontal shaft 248 supported by a terminal bracket 250 affixed to the inside of the rear wall of the lower housing 158 of the magazine unit 3. From the terminal sheave 246, the tension relief member 236 extends downwardly in a vertical direction to a housing pulley 252, where it is turned 180 degrees and proceeds in a vertical upwardly direction and is secured to a terminal lug 254 attached to the terminal bracket 250. The housing pulley 252 is mounted on a horizontal shaft 256 near the top of a vertically oriented housing 258 suspended from the tension relief member 236 by means of the housing pulley 246. The lower portion of the housing 258 is constructed to slidably contain a disc 260 and to restrict the motion of the disc 260 to the direction of the center line of the housing 258. The disc 260 is mounted on the end of a piston rod 262 extending in a vertical downwardly direction to a piston 264 mounted within an air cylinder 266 fixed vertically between an upper mount 268 and a lower mount 270 attached to the inside rear wall of the lower housing 158 of the magazine unit 3.

As the machine depletes the supply of coils 36 on the rack 172 in the coil channel 164 of the magazine unit 3, the tension member 192 moves the pressure shoe 190 closer to the delivery end of the coil channel 164. When only fourteen armature coils 36 remain on the coil rack 172 in the coil channel 164, further movement of the shoe 190 toward the delivery end of the coil channel 164 results in a switch (LS–7) being tripped by the downwardly moving spring slide 222 (Fig. 8), causing air under pressure to be introduced into the top of the air cylinder 266 after the fourteenth, and last, coil side 90 has been inserted in an armature core slot 54 and the corresponding coil leads 56 connected to the commutator 50 of the instant armature core 48 held by the air-operated chuck 52 on the base unit 1. The piston 264 within the air cylinder 266 is driven downwardly and a limit switch (LS–8) (Fig. 59) is opened, thereby preventing the starting of another machine cycle until the supply of coils 36 in the coil channel 164 has been replenished. The disc 260, pulled by the piston rod 262, bears against the bottom member 272 of the housing, drawing the housing 258 downwardly. The housing pulley 252 and the various sheaves 246, 238, and 204 are all rotated as the tension relief member 236 follows the housing 258 and draws the pressure shoe 190 from the front to the rear of the coil channel 164. The tension member 192 follows the pressure shoe 190 to the rear of the coil channel 164, as the action of the air cylinder 266 extends the coil spring 232 and moves the spring slide 222 upwardly to a starting position, thereby returning the limit switch (LS–7) to the operating position.

The first step in replenishing the supply of armature coils 36 in the coil channel 164 is the withdrawal of the shoe 190 from the space provided for it by the spacer 176 (Fig. 11) adjacent the base plate 174 of the empty rack 172 in order that the latter 172 can be removed from the coil channel 164. This first step is the function of the shoe switching mechanism shown in Figs. 7 to 9 inclusive.

Figure 10:
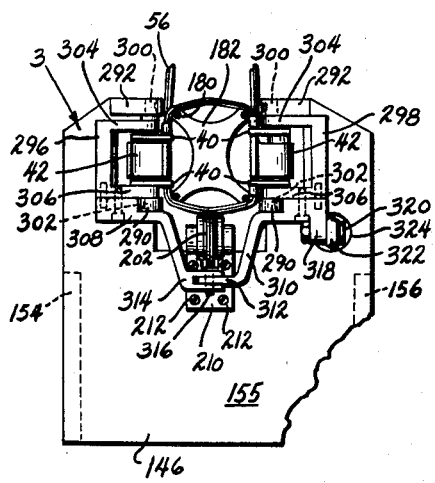
Fig. 10 is a front elevation in the direction of line 10—10 of Fig. 12 of the upper housing of the coil feeding magazine.
Figure 12:
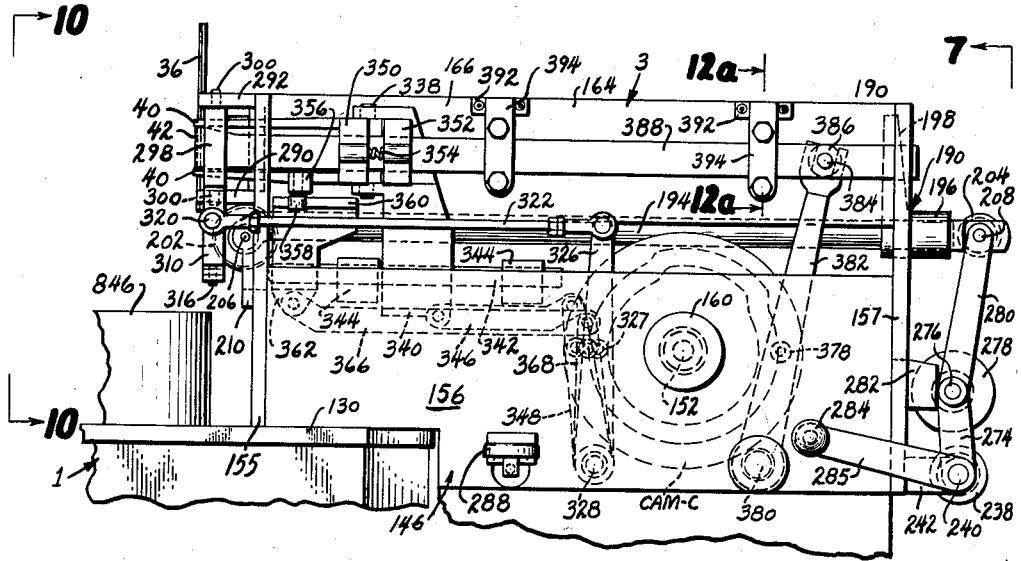
Fig. 12 is a side elevation of the coil feeding magazine as attached to the base of the machine.

The shoe switching mechanism includes two lever members 274 fixedly attached to the crank shaft 240, straddling the crank sheave 238, and extending in parallel fashion to a horizontal switching shaft 276, where each lever member 274 supports an opposite extremity of the switching shaft 276. Positioned between the parallel lever members 274 and straddling a switching sheave 278 rotatably mounted on the switching shaft 276, two connecting members 280 are rotatably attached to the switching shaft 276 and rise upwardly, in parallel fashion, to rotatable connections on the ends of the rear rod sheave shaft 208 extending horizontally through the rear rod 194. A stop 282 is affixed to the outside of the rear wall of the upper housing in a position where it will encounter the shoe 190 when lowered, as shown in Fig. 9, and the end portions of the connecting and lever members 280 and 274 journaled on the shifting shaft 276 when the shifting shaft 276 is manually revolved in counter-clockwise direction around the crank shaft 240 center line. The stop 282 is provided with a beveled top and a face which is divided by a vertical clearance slot sufficiently large to receive a portion of the shifting sheave 278 when the face of the stop is in contact with the connecting and lever members, as illustrated in Figs. 8, 10 and 12.

Figure 9:
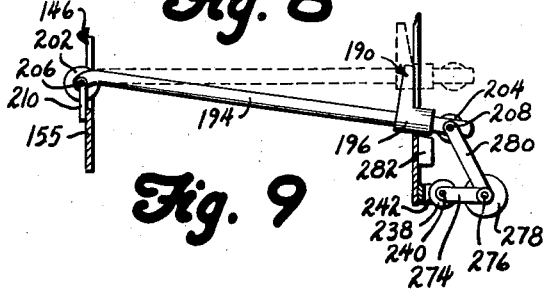
Fig. 9 is a side elevational view schematically illustrating an operative position of a tension switching mechanism used in the coil feeding magazine shown in Fig. 8.

The operator manually revolves the crank shaft 240 of the switching mechanism by means of the crank handle 284 (Fig. 7) rotating the crank arm 285, the lever members 274, switching shaft 276, and switching sheave 278 around the crank shaft 240 center line in a clockwise direction (Fig. 9). The connecting members 280 are shifted by the movement of the switching shaft 276 and cause the shoe rod 194 to pivot downwardly around the front rod sheave shaft 206, thereby lowering the rear end of the rod 194 and the shoe 190 mounted thereon. To prevent an appreciable change in the position of the shoe 190 on the shoe rod 194 as the rod 194 is pivoted, a groove 286 in the switching sheave 278 engages the tension relief member 236 and lengthens the path of the said member 236 by an amount approximately equal to the amount by which the path is shortened when the rear rod sheave 204 is lowered. When the pressure shoe 190 has been sufficiently withdrawn from the space provided by the spacer 176 adjacent the base plate 174 of the rack to allow removal of the empty rack from the coil channel 164, the bottom of the shoe 190 encounters the beveled top of the stop 282, halting both the downward movement of the shoe 190 and the rotation of the crank shaft 276 in the positions illustrated in Fig. 9. The empty coil rack 172 is manually removed from the coil channel 164, leaving less than fourteen armature coils 36 in the delivery end of the coil channel 164. A full rack of coils is manually positioned in the coil channel 164 by the operator as hereinbefore described, with the open end of the rack trunk 178 being received by the coils 36 left in the delivery end of the channel 164, insofar as is necessary. The operator manually revolves the crank shaft 240 of the switching mechanism by means of the crank handle 284, rotating the crank arm 285, the lever members 274, switching shaft 276, and switching sheave 278 around the crank shaft 240 center line in a counter-clockwise direction in the figures. The connecting members 280 are shifted by the movement of the switching shaft 276 and cause the shoe rod 194 to pivot upwardly around the front rod sheave shaft 206, thereby raising the rear end of the rod 194 and the shoe 190 mounted thereon. After the rotation of the crank shaft 240 has aligned the lever members 274 and the connecting members 280, and the shoe 190 has been raised to a position within the space provided by the spacer 176 adjacent the plate 174 of the coil rack 172 in the coil channel 164 and the shoe rod 194 is horizontal, the lever members 274 are further rotated to bring the switching shaft 276 to an overcenter locking position, shown in Fig. 8, with the ends of the lever members 274 and connecting members 280 journaled on the shifting shaft 240 bearing against the face of the stop 282 and the shifting sheave 278 positioned within the clearance slot in the stop 282.

An air valve 288 (Figs. 12 and 13) must be manually activated by the operator to reverse the direction of the applied air pressure in the cylinder 266 to raise the piston 264 to the top of the air cylinder 266, thereby closing the limit switch (LS–8) (Fig. 59) to allow the machine to become operative, and raising the flange 260 on the piston rod 262 to the upper end of the housing 258 to allow the tension member 192 to transmit the force of the coil spring 232 to the pressure shoe 190 to compress the coils 36 on the coil rack 172 in the coil channel 164. The machine may now be operated automatically.

Coil manipulating mechanisms

Figure 13:
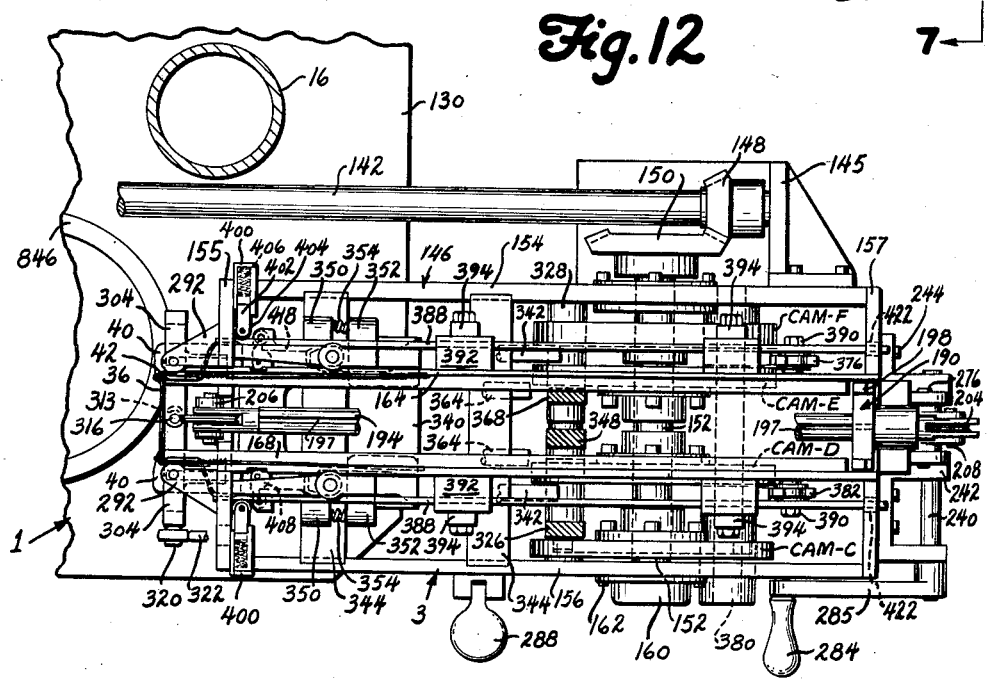
Fig. 13 is a plan view of the coil feeding magazine shown in Fig. 12.

The power transfer has been traced hereinbefore from the electric motor 116, through the belt-driven gear train 122, gear 124, drive shaft 128, and bevel gears 134 and 140, to the counter shaft 142 terminating in the gear box 144. Within the gear box 144, another bevel pinion 148 is affixed to the countershaft 142 and is held in a driving relation with a bevel gear 150 by a thrust bearing mounted on the countershaft 142 and abutting the wall 145 of the gear box 144 (Figs. 3 and 13). The bevel gear 150 is secured to the end of a horizontal cam shaft 152 rotatably supported at both ends by bearings (not shown) contained within side walls 154 and 156 of the upper housing 146 and axially secured by a cap 160 placed over one end of the cam shaft 152 and attached to the side wall 156 of the upper housing 146 by appropriate means, such as bolts 162. The cam shaft 152 is located below and perpendicular to the longest dimension of the coil channel 164 and drivingly supports four vertically oriented face cams, C, D, E, and F, which, in turn, actuate a coil clamp mechanism, shown in Figs. 14 and 15, a pick-up fingers mechanism, illustrated in Figs. 15, 16, and 17, and a spring fingers mechanism, best seen in Figs. 17 thru 19.

The coil clamp mechanism is provided with four horizontal clamp supporting brackets 290 and 292 which are attached to the front wall of the upper housing 146 and extend forwardly therefrom (Fig. 10). Upper bracket 292 and lower bracket 290 are vertically aligned in pairs and are provided with vertically aligned holes (not shown), being positioned on each side of the coil channel 164. U-shaped right and left yokes 296 and 298 are pivotally mounted between the upper and lower brackets 290 and 292 on the right and left side of the coil channel 164 with the open ends of the yokes 296 and 298 facing each other. Yokes 296 and 298 pivot through a small horizontal arc on vertical pins 300 and 302 affixed to the upper and lower leg members 304 and 306 of the yokes 296 and 298 and journaled in the holes (not shown) in the upper bracket 292 and the lower bracket 290. Coil clamp members 294 and 295, best seen in Fig. 14 and integral with the yokes 296 and 298, extend, in a lateral, rearwardly direction from the end portions of the leg members 304 and 306 of the yokes 296 and 298 and are provided with bosses having coil-contacting surfaces 38 in the nature of vertical striations formed thereon adjacent the coil channel 164. Left and right driving members 308 and 310 for the yokes 296 and 298 are provided being fixedly attached to the lower leg members 306 of the yokes and are conformed downwardly and inwardly to avoid interference with neighboring parts, as may be seen in Fig. 10.

The lower ends of the members 308 and 310 cooperate, the end 314 of the left driving member 308 being bifurcated to receive the lower end 312 of the right driving member 310. A vertical connecting pin 316 is journaled in the bifurcated portion and passes through an elongated hole 313 provided in the interposed end 312 of the right driving member 310, as may be seen in Fig. 13.

The right driving member 310 (Figs. 10 and 12) has an integral downwardly and outwardly extending driving lug 318 provided, oppositely disposed from the end 312, with a horizontal stud 320 rigidly secured to the lug 318 by an appropriate fastener, such as a nut. The front end of an adjustable pitman 322 is provided with an oversized hole by which it is connected to the stud 320 to form a driving connection having the approximate characteristics of a universal joint within a limited range of movement. The pitman 322 extends rearwardly through a hole 324 in the front wall of the upper housing 146 and is hingedly secured to the upper end of an oscillating lever 326 (Figs. 12 and 13) fulcrumed at its lower end on a horizontal, transverse, stationary shaft 328 extending from a fixed mounting in the left wall 156 to a similar mounting in the right wall 154 of the upper housing 146. A rotary type cam follower 327 indicated generally in Fig. 12 is mounted medially on the lever 326 and is received by a groove indented in the right side of the face cam C secured to the cam shaft 152.

It will now be clear that rotation of the cam shaft 152 revolves the cam C and oscillates the lever 326 causing the pitman 322 to reciprocate and move the lug 318 (Figs. 10 and 15) on the right driving member 308. When the lug 318 is urged forwardly by the pitman 322, the assembly of the right driving member 310, right yoke 298, and right clamp 38 is pivoted clockwise about the vertical pin 300 on the right yoke 298 and the lower end 312 of the right driving member 310 moves rearwardly. The connecting pin 316 slides laterally in the elongated hole 313 in the right driving member 310 and carries the lower end 314 of the left driving member 308 rearwardly, pivoting the assembly of the left driving member 308, the left yoke 296, and the left clamp 38 in a counterclockwise direction about the vertical pin 300 on the left yoke 296. With the lug 318 in a forward position, the coil clamp mechanism is "open" and the coil contacting surfaces of the right and left clamps 38 are positioned behind the sides 166 of the coil channel 164 to allow the coils 36 to move forwardly, as shown in Fig. 15. Fig. 14 shows the coil clamp mechanism in a "closed" position with the coil contacting surfaces of the right and left clamps engaging the sides of the coils 36 in the coil channel 164 to prevent movement of the coils.

The function of four pick-up fingers 40 of the magazine unit 3 is to separate the most forwardly coil 36 from the remainder of the coils 36 in the coil channel 164 and deliver the separated coil 36 to a pair of spring fingers 42 of the magazine unit 3. The four pick-up fingers 40 are arranged in vertically aligned pairs on each side of the delivery end of the coil-channel 164 and a description of one pair will apply equally in all respects to the opposite pair of pick-up fingers 40.

The L-shaped pick-up fingers 40 (Figs. 16 and 17) are provided with coil contacting notches 332 on the ends of transversely oriented short leg members 330 formed to receive the several wire turns constituting a coil side 90 and having a front inwardly extending finger tip portion 334, extending beyond a rear side for a reason to be later divulged. The fingers are hinged at the end of the longer leg members 336 distal from the tip portions 334 on vertical pins 338 secured to a member 340 slideably mounted on two horizontal rails 342 (Fig. 12) supported by transverse beams 344 having ends affixed to the right and left walls 154 and 156 of the upper housing 146. The slideable member 340 is pivotally connected to one end of a connecting bar 346 which actuates it having its opposite end hingedly attached to the upper end of an upright lever 348 fulcrumed at its bottom on the stationary shaft 328 described above. A roller type cam follower which is not shown but is similar to that described in connection with the cam C, is rotatably secured to the lever 348 and is received by a cam path depressed in the right side of cam D (Fig. 13) mounted on the cam shaft 152.

Extending outwardly from the coil channel 164, a block 350 (Figs. 16 and 17) is fastened to the sides of the longer leg members 336 of both vertically aligned fingers 40. Another block 352 is similarly attached to the slideable member 340 and a spring 354 is held in compressed position between the blocks 350 and 352 to provide a spring bias for the pairs of arms 336. The resilient spring bias is a means for rotating the pairs of fingers 40 around the vertical pin 338 toward the coil channel 164, thereby bringing the coil contacting notches 332 closer together in a closing action.

A lug 356 (Figs. 12, 16 and 17) is provided which extends downwardly from a medial position on the lower finger 40 of each pair on which are journaled the pintles of rollers 358 which are urged toward the coil channel 164 by spring 354, so as to engage opposite formed edges of a flat cam member 360 mounted on top of a cam support member 362. The cam support member 362 (Figs. 12 and 13) is firmly secured to the end of two horizontal rods 364 slideably mounted in apertures in transverse beams 344 previously described. The cam support member 362 has pivotally secured to its lower side one end of a connecting bar 366 which has its opposite end hingedly attached to the upper end of an upright lever 368 fulcrumed at the bottom on the stationary shaft 328. A roller type cam follower, which is not shown but is similar to that described in connection with cam C, is rotatably secured to the end of the lever 368 and is received in a cam path depressed in the left side of face cam E mounted on the cam shaft 152 (Fig. 13).

Figure 17:
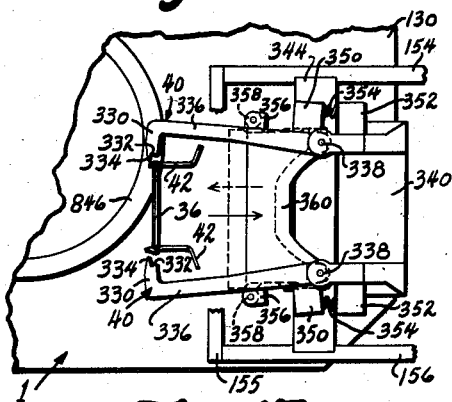

The flat cam 360, best seen in a plan view in Figs. 15, 16, and 17, is provided with two lobes 370 and 372 flanking a central depressed portion 374. The high lobe 370 compels a greater roller displacement from the coil channel 164 center line, with resultant greater horizontal separation of the finger tips 334, than the rear lower lobe 372 which causes a partial closure of the fingers 40 when engaged by the roller 358. The central depressed portion 374 limits the amount of closure of the fingers 40 to prevent coil distortion under the pressure of the spring 354.

Since the roller 358 and the flat cam 360 controlling the amount of finger closure 40 are selectively reciprocated by different linkages connected to different face cams D and E mounted on the cam shaft 152, it is apparent that the grooves in the cams D and E are the means by which a timed relation between the finger action and finger location is achieved. This timed relation is graphically shown in Fig. 58.

Rotation of the cam shaft 152 by the main driving means revolves the two face cams D and E moving the two cam followers and levers 348 and 368. One connecting bar 346 reciprocates the fingers 40, through the sliding member 340 on rails 342, in a path parallel to the longitudinal center line of the coil channel 164. The other connecting bar 366, through the described linkage, causes the flat cam 360 to engage the reciprocating roller 358 in various positions, thereby controlling the amount by which the finger tips 334 are opened against the bias of the springs 354.

The action of the pick-up fingers 40 will now be traced through a cycle wherein one armature coil 36 is "picked up" from the delivery end of the coil channel 164 and delivered to the spring fingers 42. As the pick-up fingers 40 are returning to the rear end of the stroke at the delivery end of the coil channel 164, the roller 358 is engaged by the rear lobe 372 of the flat cam 360 and the fingers 40 assume a partially closed position wherein the finger tips 334 are projected inwardly beyond the vertical sides 166 of the coil channel 164. The fingers 40 continue rearwardly and the first coil 36 in the coil channel 164 is missed entirely by the notches 332 but is engaged by the finger tips 334 of the pick-up fingers 40. As this contact is made, the coil clamp 38 is opened by the previously described mechanism consisting of cam C, lever 326, rod 322, and lug 318, and the coils 36 in the coil channel 164 are compressed between the pressure shoe 190 and the finger tips 334 in the position shown in Fig. 15. Under the compulsion of the pressure shoe 190, the coil rack 172 and all the coils 36 in the coil channel 164 are moved forwardly to a position beyond the forward extremity of the coil clamp 38 by the width of a single coil 36. At this point, the coil clamp 38 is closed to relieve the finger tips 334 of the shoe pressure 190. Almost immediately the flat cam 360 is moved to center the roller 358 between the lobes 370 and 372 to close the pick-up fingers 40, causing the notches 332 to engage the sides 90 of the first coil 36 and support it, as shown in Figure 16. The flat cam 360 and fingers 40 are now moved forwardly together to maintain their relative position and keep the fingers 40 closed. At the forward extremity of the stroke of the pick-up fingers 40, a pair of relatively wide spring fingers 42 is caused to engage the coil sides 90 between the pairs of pick-up fingers 40 and support the coil 36 by means to be described hereinafter. Simultaneously, the flat cam 360 is moved, so that the high lobe 370 engages the roller 358 to open the pick-up fingers wide enough to allow the coil 36 to pass untouched between the finger tips 334 as it is moved forwardly by the spring fingers 42. This action is illustrated in Fig. 17. The pick-up fingers 40 then move rearwardly to repeat the cycle as described.

The spring fingers 42 (Figs. 12 and 13) are actuated by a face cam F mounted on cam shaft 152 having a depressed roller path (not shown) located in the left side thereof, which rotatably receives a roller 378 rotatably mounted on an upright lever 376 in the right hand portion of the upper housing 146. The bottom of lever 376 is firmly attached to a horizontal shaft 380, the ends of which are rotatably supported by bearings (not shown) affixed to the right and left side walls 154 and 156 of the upper housing 146. Another lever 382, similar to the upright lever 376, is located in the left hand portion of the upper housing 146 and is firmly attached at the bottom to the horizontal shaft 380. Looking at Fig. 13, it can be seen that rotation of the cam F on the cam shaft 152 moves the right lever 376 turning the horizontal shaft 380 causing the left lever 382 to duplicate the oscillatory movement of the right lever. The remainder of the construction of the spring fingers mechanism is similar on each side of the coil channel 164, so that a description of the portion on the left side will apply equally in all respects to the portion on the right side.

The upper end of the lever 382 (Figs. 12, 12a and 13) is bifurcated and receives a horizontal stud 384 supporting spacers 386 adjacent the lever 382 and rigidly secured, by means of a nut 390, to a movable horizontal bar 388 of slightly greater length than the upper housing 146. This method of assembly provides a driving connection having the approximate characteristics of a universal joint within a limited range of movement to accommodate small angular movements of the bar 388, as will be explained later. To slideably support the bar 388, two brackets are provided, each comprising a horizontal portion 392 affixed normally to the outside of the left side wall 166 of the coil channel 164 and a downwardly extending vertical portion 394. Two vertically juxtaposed, horizontally mounted rollers 396, spaced to allow the bar 388 to reciprocate horizontally between them, are positioned on the vertical portion 394 to extend inwardly toward the coil channel 164. The rollers 396 are of relatively short length, providing a space adequate to allow passage of the lever 382 between the ends of the rollers 396 and the side 166 of the coil channel 164. Further clearance for the oscillation of the lever is provided by the slot 398 in the rear vertical portion 394 of the bracket 392 which allows the nut 390 to move freely through the rear bracket, as can be seen in Fig. 12A.

A spring retainer 400 (Figs. 18 and 19) is transversely mounted on the inner side of the front wall 155 of the upper housing 146 and supports a slideable inner member 402 carrying a horizontal roller type follower 404. A coil spring 406, compressed between the retainer 400 and the slideable inner member 402, urges the roller 404 inwardly, so that contact between the roller 404 and the outer side of the bar 388 is continuous (Figs. 18 and 19). The spring pressure provided by the roller mechanism also maintains contact between the inner side of the bar 388 and a flexing cam 408 rotatably mounted in a horizontal plane on a pivot pin 409 affixed to a bracket 410 secured to the outer side of the rail 166 of the coil channel 164. The cam 408 has a flat face 411 on its rear side (Fig. 18). The bracket 410 is provided with a stationary pin 412 restraining one end of a spring 414 having its opposite end secured to another pin 416 positioned on the flexing cam 408 at a point displaced from the pivot pin 409, whereby the flexing cam 408 is urged to rotate clockwise on the pivot pin to an extended or "open" position, as shown in Fig. 19. A stop 417 is provided to limit rotation. A block 418, having an inclined surface 419 at the rear end thereof, is attached to the inner side of, and travels with the bar 388 in such a manner that it engages the flexing cam 408 to control the movements of spring finger 42 closure, as will be explained.

The spring fingers 42 are constructed of strongly resilient material and are attached to the front end of the bars 388 in any convenient manner. The forward ends of the spring fingers 42 are provided with shaped, vertical, coil-gripping grooves 420 (Fig. 19), with which a single armature coil 36 may be firmly gripped by its sides 90 and transported to a pre-inserted position above an armature core 48 held by the air-operated chuck 52 on the base unit 1.

With the levers 376 and 382, bars 388, and fingers 42 at an extreme rearwardly position in their oscillatory stroke (Fig. 19), the spring fingers 42 are in a closed position, having a coil 36 gripped between the vertical grooves 420 in the right and left fingers 42 being held in place by the inward pressure of the springs 406 (Figs. 18 and 19) acting against the outer sides of the bars 388. As the levers 376 and 382 move forward by the action of their cooperating cam to move the bars 388 and fingers 42 forward, the vertical forward ends of the blocks 418 engage flat faces 411 on the flexing cams 408 and rotate them on the pivot pins 409 against the action of the springs 414, thereby preserving the "closed" position of the fingers 42 during the forward movement of the fingers as illustrated in Fig. 18. When the bars 388 carry the blocks 418 beyond the flexing cams 408, the springs 414 return the flexing cams to the normal, outwardly extending position as determined by the stop 417 without disturbing the finger positions. At the extreme forward end of the stroke, the coil 36 is removed vertically from the grip of the spring fingers 42 in a manner which will be described later, and the rearward movement of the assembly is started. The inclined end 419 of the block 418 encounters the rounded side of the flexing cam 408 which is positioned against its stop 417 to prevent further clockwise rotation. The blocks 418 ride up on the cams 408, flexing or spreading the bars 388 outwardly against the bias of springs 406 to open the fingers 42. Near the end of the rearward stroke, the rear end of the bars 388 adjacent the actuating cams pass through apertures 422 (Figs. 7 and 13) in the rear wall 157 of the upper housing 146 and strike the base plate 174 of the coil rack 172 (previously described) positioned in the coil channel 164. Continued rearward movement of the bars 388 pushes the coil rack 172 rearwardly in the broad slots in the retaining lugs 186 and withdraws it from the coils 36 in the coil channel 164 by an amount approximately equal to the thickness of a single coil 36.

At the rear extremity of the stroke, the square forward end of the block 418 passes the flat portion 411 of the flexing cam 408 and the bars 388 are snapped closer together by the coil springs 406, thereby returning the fingers to the closed position. This action is synchronized with the previously described mechanism actuating the pick-up fingers 40, as can be seen in Fig. 58, so that the spring fingers 42 close on a single coil 36 held by the pick-up fingers 40 at the forward end of their stroke. The pick-up fingers 40 are immediately opened and the cycle of the spring fingers 42 is repeated.

*Coil-inserting and connecting mechanism*

Referring to Figs. 3 and 19 through 24 a mechanism is disclosed constituting means whereby an armature coil 36 of the preformed type, having leads 56 bare of insulation, is transferred from a pair of spring fingers 42 of a magazine unit 3 vertically downward to an inserted position in a slot 54 in an armature core 48 held firmly by an air-operated chuck 52 mounted on a base unit 1. To accomplish this end, a vertically movable, coil-pull-down-arm 44 (Figs. 20 and 21) is provided, hereinafter called the arm 44, carrying at its upper end a rotating jaw 46 and a sliding jaw 47 (Figs. 22 and 23) which cooperate at the proper time to grip the bottom side 424 (Fig. 11), or closed side, of the armature coil 36.

The rotating jaw 46 is pivoted at a medial point on a horizontal pivot pin 426 secured to the arm 44. The inner side portion 428 of the lower end of the rotating jaw 46 is contoured to function as a cam follower and to cooperate with a jaw closing cam 430 integral with a medial portion of the sliding jaw 47. Slightly above the pivot pin 426, the inner side of the rotating jaw 46 is further contoured to function as another cam follower 432 to cooperate with a jaw opening cam 434 integral with an adjacent portion of the sliding jaw 47.

The sliding jaw 47 is mounted within the arm 44, which is U-shaped in form, to allow vertical reciprocation. An operating member 436 for the sliding jaw is fixed to its lower extremity 438 and protrudes outwardly perpendicularly to the line of movement of the sliding jaw 47, through a slot 440 in the wall of the arm 44. The ends of the slot 440 define the limits of the vertical reciprocatory movement of the sliding jaw 47, relative to the arm 44.

It may now be seen that an upward movement of the sliding jaw 47 within the arm 44 moves the closing cam 430 into contact with its follower 428 on the rotating jaw 46, revolving the latter clockwise about the pivot pin 426 and urging an undercut coil holding surface 442 of the rotating jaw 46 toward a cooperating coil holding surface 444 of the sliding jaw 47, thereby firmly gripping the armature coil 36. The coil holding surfaces 442 and 444 are so contoured that the closing action of the jaws 46 and 47 arranges the coil turns by compression into two flat layers of three wires each (Fig. 23). Continued upward movement of the sliding jaw 47 slides one wire layer over the other to form an imbricate pattern which reduces the transverse dimension of the coil side with the center lines of the wires of one layer opposite the points of tangency of the wires of the other layer. This facilitates the entry of the coil 36 into the core slot 54 during the inserting motion of the arm 44 by reducing the thickness of the wire layers to a dimension somewhat less than twice the diameter of the coil wire. Further movement of the sliding jaw 47 applies pressure to both sides and both ends of the coil bottom leg 424 to lock the individual coil wires, and the entire coil 36, in place in the grasp of the jaws 46 and 47. The arm 44 is slidably mounted on a housing 446 (Figs. 20 and 21) provided with vertical slot 448, parallel to a work shaft 32 to be described hereinafter. Two plates 450, conventionally secured to the housing 446 and slightly overlapping the slot 448 on each side, confine the arm 44 to reciprocatory movement in a vertical direction. An arm operating member 452 (Fig. 22) is affixed normally to the lower portion of the arm 44 and extends outwardly from the slot 448 through the aperture formed by the plates 450. The jaw-operating member 436 also extends through the aperture formed by the plates 450.

The arm operating member 452 and the jaw operating member 436 are attached by similar linkages to a driving means in the base unit 1 of the machine, so that a description of one linkage will serve to describe the other. The arm operating member 452 is equipped with a roller 454 (Figs. 20 and 21), rotatably secured to the member 452 and is loosely fitted into an elongated hole 458 in the end of a lever 460, the other end of which is pivotally attached to a bracket 462 fixed to a wall 456 of the base unit 1. A roller type cam follower 464 is rotatably fixed to the lever 460 in an appropriate medial position, to cooperate with a groove 466 of a barrel, or cylinder cam B, which carries another groove 468 disposed above the aforementioned groove 466 to control the sliding jaw operating member 436 by another lever disposed in parallel relation.

The barrel cam B is mounted on a vertical drive shaft 128 rotatably supported at its upper end by the top plate 130 of the base unit 1 and rotated by the motor 116 through a conventional pulley driven gear train 122, as hereinbefore described. As the barrel cam B revolves, the followers 464 and 465 are raised or lowered, according to the conformation of the cam grooves 466 and 468, and the vertical motions of the followers 464 and 465 are amplified and transmitted to the arm 44 and sliding jaw 47 through the linkage described.

When the vertical distance from the center line of the upper groove 468 of the barrel cam B to the center line of the lower groove 466 of the barrel cam B is increased, as illustrated in Fig. 21, the cam followers 464 and 465 with their arms 460 including the elongated holes 458 and operating members 452 and 436 of the two linkages are separated by a proportionally greater distance, with the result that the sliding jaw 47 is moved upwardly with respect to the arm 44 and the sliding jaw closing cam 430 operates to actuate the rotating jaw 46 to close and lock the jaws, thereby gripping the bottom coil side 424. A decrease in the vertical distance between the center lines of the grooves 466 and 468 on the barrel cam B similarly actuates the sliding jaw opening cam 434 to open the jaws 46 and 47 and release the armature coil bottom leg 424.

When the relation of the center lines of the two grooves 466 and 468 on the barrel cam B is two substantially parallel lines, the motion of the rotary jaw 47 is arrested and the arm 44, carrying the rotary jaw 46 can be raised or lowered without jaw movement.

Figures 26, 31 and 32 disclose details of a guide mechanism 58 for the leads of a coil 36. As an armature coil 36 is pulled downwardly toward the inserted position in the armature core 48 by the coil-pull-down arm 44, previously described, a sleeve shaft 30 is rotated to bring two lead stops 72 and a lead clamp 74 into position to perform their various functions on the coil leads which will be explained later. In this phase of the cycle, the two leads 56 to be connected to the commutator are very close to the sleeve 60. Due to slight variations in the position of the coil leads 56 as they are delivered to the coil-pull-down arm 44, the possibility exists that some of the leads 56 will be deflected by the rotating sleeve 60. The function of the lead guide 58 is to eliminate this eventuality by pushing, or bending, the coil leads 56 to be connected to a locus on a constant radius of the sleeve 60, in anticipation of the arrival of the lead stops 72 (Figs. 26, 33, and 34) and a lead alignment block 68.

The coil lead guide 58 is a thin bar, formed arcuately to fit the contour of a transverse groove 470 (Fig. 32) in the wall of the sleeve 60. One extremity of the lead guide 58 is bent outwardly sufficiently to form a retaining finger 472 to prevent the escape of any malformed coil leads 56 as they are urged to a predetermined position by the lead alignment block 68, while the opposite end is attached to, and moves as an extension of, the depending arm 476 of a bell crank 474, the other arm 478 of which cooperates with a cam G (Fig. 31). The bell crank is pivoted on pin 480 supported by a bracket 482 attached to the face 484 or front wall of the connecting unit housing 486. The shorter or follower arm 478 of the bell crank forming the lead guide 58 extends through an opening 488 in the face 484 of the connecting unit housing 486 and terminates in contact with the operating face 490 of the disc cam G fixed to the vertical cam shaft 22.

The cam shaft 22 (Fig. 25) is rotatably supported by bearings 494 held in a cover plate 496 and a bottom plate 498 of the connecting unit housing 486 and is provided with a coupling element 26 on the lower end whereby driving contact with a coupling element 28 on the power shaft 24 is obtained when the connecting unit 2 is in the operating position.

Returning now to Fig. 31, a coil spring 500 is provided to cooperate under compression with an extension 502 of the bell crank 474 above the pivot pin 480, being anchored on the face 484 of the connecting unit housing 486 to urge the bell crank to rotate in a counterclockwise direction to keep the cam follower arm 478 in contact with the cam G. The spring 500 constantly urges the lead guide 58 toward the transverse groove 470 in the wall of the sleeve 60.

When the connecting unit 2 is in the operating position, the cam shaft 22 is revolved by the power shaft 24 (Fig. 25) in the base unit 1 through the two coupling elements 26 and 28, and turns the disc cam G. The bell crank 474 and its cam follower arm 478 are rotated on the pin 480 in response to the disc cam G contour and move the lead guide 58 radially away from the sleeve 60, the lead guide 58 pushing the coil leads 56 before it. After the lead alignment block 68 on the connecting unit 2 and the lead stops 72 on the sleeve 60 have made contact with the coil leads 56, the action of the disc cam G allows the spring 500 to return the lead guide 58 to the transverse groove 470 in the wall of the sleeve 60 and to restrain it there during the remainder of the machine cycle.

Referring to Figs. 26, 33, 34 and 35, a lead alignment arm 62 is disclosed, which adjusts the coil leads preparatory to making connections to the commutator.

Suitable brackets 503 suitably attached to the face 484 of the connecting unit 2 rotatably support a spindle 504 (Fig. 33) mounted in a vertical position parallel to a sleeve shaft 30. The lower end of the spindle has mounted thereon two similarly shaped lead alignment arms 62U and 62L, one arm 62U being positioned directly above the other on the spindle. The arms 62L and 62U are of rectangular cross-section, arcuately shaped to conform closely to the periphery of the sleeve 60 and mounted to rotate with and about the spindle 504 in a horizontal plane. The upper arm 62U is fixedly attached to the spindle 504, which drives the arm 62U through its operating arc, while the lower arm 62L is freely rotatable on the spindle 504. For simplicity of explanation, the coil lead contacting ends of both upper and lower arms 62U and 62L have been collectively termed the lead alignment block 68, shown in detail in Fig. 35.

The upper portion of the block is integral with the upper arm 62U, having an attached, slightly thicker, vertical member 506 supporting a horizontal portion 508, the end of which forms an upper face 66U, or upper lead contact surface, of the block 68. The lower portion of the block 68 adjoins the horizontal lower arm 62L having a vertical member 510 rising below the horizontal portion 508 of the upper arm 62U and supporting a horizontal projection 512, the end of which forms the toe 64 and lower face 66L, or lower lead contact surfaces of the block 68. The vertical member 510 of the lower arm 62L rigidly supports a horizontal, rearwardly extending stud 514 mounted to slideably extend through an oversized hole (not shown) in the upper arm vertical member 506 and is adapted to be locked in place by a suitable adjustable fastening device 518, the stud 514 mounting a helical spring 520 positioned between the vertical members 506 and 510 of the block.

It can be seen that the lower arm 62L, which is freely mounted on the spindle 504, is adapted to be rotated clockwise around the spindle 504 in a resilient manner by the upper arm 62U through the action of the spring 520. The resilient connection provided by the spring 520 allows the upper and lower block faces 66U and 66L to be vertically aligned during use. Both faces 66U and 66L then exert pressure together, the upper face 66U by being directly connected to the rotating spindle 504 and the lower face 66L by acting through the resilient connection.

To drive the members, a crank 522 is fixed on the upper end of the spindle 504 (Fig. 33), the crank being connected to one end of a lever 524 by means of a link 526 extending through a hole 528 in the face 484 of the connecting unit 2. At the opposite extremity, the lever 524 is pivotally secured to a bracket 530 attached to the inside of the face 484 of the connecting unit housing 486. A roller type cam follower 534 is appropriately mounted at an intermediate position on the lever 524 and is rotatably fitted into a groove 536 of a face cam H fixed to the cam shaft 22 vertically mounted in the connecting unit 2 as previously described.

When the connecting unit 2 is in the operating position, the power shaft 24 (Figs. 3 and 25), through two coupling elements 26 and 28, revolves the cam shaft 22, which, in turn, revolves the face cam H. The lever 524 is shifted by the cam and its roller 534 and rotates the crank 522, spindle 504 and upper alignment arm 62U, the latter 62U swinging the lower alignment arm 62L through its operating arc by means of the spring 520. The lead guide 58 pushes the leads 36 radially away from the sleeve 60, as previously described, and the toe 64 on the lower face 66L of the block 68 is inserted between the leads 36 and the sleeve 60 below the lead guide 58. Immediately thereafter, the coil leads 56 are contacted by the lower block face 66L at a point adjacent the body of the coil 36 and pushed into the aligned position against the lead stops 72 which have been rotating toward the block 68 from the opposite side of the sleeve 60. The spring 520 is compressed as the upper arm 62U continues to rotate to its final position 62U shown in Fig. 34, where the two leads 56 and a sleeve recess 70 are radially aligned with the sleeve shaft 30. In the final position, the upper face 66U is aligned with a side of the sleeve recess 70, while the lower face 66L urges the leads 56 toward the lead stops 72 under compulsion of the compressed spring 520. The toe 64 on the lower face 66L is finally stationed between the sleeve recess 70 and the sleeve shaft 30 in a transverse clearance groove 538 in the sleeve wall 60.

After the leads 56 have been removed from contact with the alignment block 68 by means to be described, the cam H actuates the linkage to return the alignment block 68 to the starting position shown in Fig. 33.

The possibility of a "cross connection" is substantially avoided by the action of this mechanism in retaining the leads 56 in the same relative position they have when emerging from the body of the coil 36. The initial squeezing contact of the leads 56 by the lower face 66L and the lead stop 72 occurs at a point on the leads as close to the body of the coil 36 as is practical to preserve these relative positions. The second contact is made at a point further removed from the body of the coil 36 by the upper face 66U and lead stop 72. In substantially all cases where the leads 56 begin to "twist" above the lower contact, the upper contact will restore them to the "untwisted" relative position held at the lower contact. The correctly positioned lengths of the leads 56 between the upper and lower contact points are grasped by a clamping means, later to be described, and finally locked in the correct relation to insure the connection of each lead to the proper commutator segment.

Referring to Figs. 3, 25, 26 and 36 through 42, the sleeve shaft 30, already referred to, is rotatably and slideably mounted in two brackets 40 (Fig. 3), suitably attached to the face 484 of the connecting unit 2. Also fixed to the face 484, but between the brackets 40, is a block 542 (Figs. 38 and 39) rigidly supporting two, roller type, cam followers 84 and 86, the horizontal center lines of which are vertically aligned and lie in a plane through the sleeve shaft 30 center line. The upper and lower cam followers 84 and 86 are separated by a co-operating strip cam 82, which passes between them. The strip cam 82 extends partially around, and is secured to, the sleeve shaft 30 periphery and is shaped to raise or lower the sleeve shaft according to the direction of its rotation.

The lower end of the sleeve shaft 30 concentrically carries the sleeve 60 which supports two, outwardly extending, lead stops 72 on its periphery (Fig. 26). The lead stops 72 have coil lead contact surfaces 544 (Fig. 33) aligned in a vertical plane and are separated sufficiently to allow horizontal movement of a lead clamp 74 between them. The sleeve 60 has a flattened side 546 (Fig. 33) for the purpose of providing additional clearance between the sleeve 60 and two armature coil leads 56 as the coil 36 is being pulled downwardly toward the inserted position in an armature core 48 by the coil-pull-down arm 44, previously described. The bottom of the sleeve 60 is open, having a bore 548 (Figs. 38 and 39) of sufficient size to receive the commutator end 50 of an armature core 48 when the sleeve 60 is lowered to a staking level by the action of the strip cam 82. The bottom edge of the sleeve wall 60 carries two vertical trim and guide slots 112 (Fig. 27), so positioned as to be aligned with adjacent commutator slots 96 when the sleeve 60 is at the staking level. A vertical recess 70 is directly over one of the trim and guide slots 112 and is positioned to receive one coil lead 56I (Fig. 45) moving inwardly along a radius of the sleeve 60 between two lead stops 72 and a lead alignment block 68. The horizontal and vertical grooves of special contour, which are being described in conjunction with their cooperating parts, are all located over the outside surface of the sleeve 60.

A bracket 540 rotatably supporting the clamp shaft 76 passes through an aperture 541 in the side of the sleeve 60 and is rotatably attached to the sleeve shaft (Figs. 3 and 26).

A crank 550 is fixedly attached to the sleeve shaft 30 immediately above the upper mounting bracket 40 and is attached to the outer end of a cam follower lever 552 (Fig. 36) by an intermediate connecting rod 554 having universal joints 556 at both ends, so constructed that misalignment will not affect the performance of the linkage. The universal joints 556 are necessary, since, in addition to normal horizontal movement, there is relative vertical motion between the crank 550 and the cam follower lever 552, as the crank 550 carrying sleeve shaft 30 moves vertically in response to the action of the strip cam 82. The cam follower lever 552 extends through a hole 553 in the face 484 and is pivotally mounted at its opposite extremity on a vertical locating column 18 rigidly mounted on the cover plate 496 of the connecting unit housing 486, where it is firmly secured by a cap 558 (Fig. 25), and also held by a support member 560 attached to the bottom plate 498. The outside diameter of the column 18 in increased below the support member 560 to co-operate with the inside diameter of the locating sleeve 20 (Fig. 1) mounted on the base unit 1 for the purpose of locating the connecting unit 2 in an operating position (Fig. 25). The cam follower lever 552 medially carries a rotatably attached cam follower 562 suitably fitted into a groove 564 in a face cam I mounted on a cam shaft 22.

The crank 550 horizontally supports an integral spring housing 566 (Figs. 36 and 37) containing a compressed coil spring 568 mounted to direct its force along a horizontal line tangent to the sleeve shaft 30. This force is exerted against the side of a lug 570 extending downwardly from a clamp shaft supporting member 572, of which it is an integral part, into an annular slot 574 through the sleeve shaft crank 550. The spring 568, entering the annular slot 574 through an end wall aperture therein, constantly urges the lug 570 toward the opposite end of the annular slot 574, thereby creating a torque tending to rotate the clamp shaft supporting member 572 about the sleeve shaft 30 in a counterclockwise direction. Since the clamp shaft supporting member 572 is rotatably mounted on the sleeve shaft 30 and rotatably supports the clamp shaft 76, the relative angular movement of the clamp shaft 76 and the sleeve shaft 30 is limited to the angular movement of the lug 570 in the annular slot 574. This movement, when transmitted to the sleeve periphery is equal to the distance between adjacent commutator slots 96 (Fig. 27).

The horizontally rotating lead clamp 74 is perpendicularly attached to the lower end of the clamp shaft 76 and is positioned to pass between the lead stops 72 as it is moved counterclockwise (Figs. 34 and 45). The lead clamp 74 is provided with a slotted arcuate lead contact surface or face 576, which cooperates with the sleeve periphery and has a vertical recess 80 sufficient to receive the armature coil lead 56X. Two striking blade clearance slots 113 are provided in the bottom of the lead clamp 74 (Fig. 34).

On the upper end of the shaft 76 a clamp shaft double crank 578 is fixed to the clamp shaft and is provided with cam followers 580 and 581 formed on each of its arms to cooperate with a cam lobe 582 horizontally projecting from a crank cam member 584, rotatably mounted on the sleeve shaft 30 (Fig. 40). In addition to the cam lobe 582, the periphery of the crank cam member 584 carries a pair of concentrically positioned stops 588 and 590 (Fig. 41) with relation to the sleeve shaft center line. A crank 592, rotatably mounted on the sleeve shaft 30 above the crank cam member 584, integrally supports a downwardly extending driving finger 594 which is vertically received between the stops 588 and 590. The driving finger 594 is contoured on its sides to cooperate with the stops 588 and 590. The cam crank 592 is connected to one end of a clamp face cam follower lever 78 by a connecting rod 598 equipped at both ends with universal joints 600 similar to those operating in the sleeve shaft linkage 30 and previously described herein. The follower lever 78 extends through an aperture 602 in the face 484 and the opposite end is pivotally attached to the vertically oriented locating column 18 previously described herein. At the center portion, the follower lever 78 supports a rotatably mounted, roller type cam follower 604 fitted into a groove 606 of a face cam J secured to the cam shaft 22.

A review of the sequential operation of the sleeve shaft mechanism 30 and the lead clamp mechanism 74 will further clarify their functions. With the connecting unit 2 in operating position, coupling elements 26 and 28 connect the power shaft 24 to the cam shaft 22, which rotates the sleeve shaft face cam I shifting the sleeve shaft follower lever 552. Although the sleeve shaft 30 (Fig. 39) is in raised position at this time in response to the action of the strip cam 82, the motion of the follower lever 552 is transmitted to the sleeve shaft crank 550 (Fig. 36) through the universal joints 556 of the connecting rod 554 and the sleeve shaft 30 is revolved counterclockwise. Rotation of the sleeve shaft 30 turns the integral sleeve 60 and positions the lead stops 72 and the sleeve recess 70 to receive the leads 56I and 56X (Fig. 43). The spring 568, mounted horizontally on the sleeve shaft crank 550, holds the lug 570 of the clamp shaft supporting member 572 against the opposite end of the annular slot 574 in the sleeve shaft crank 550 until the clamp shaft end 76 of the said member 572 impinges against a stop 608 mounted on a bracket 610 secured to the face 484 of the connecting unit 2 (Fig. 37). With the clamp shaft 76 in the aligned position, the clamp shaft supporting member 572, bearing the lug 570, ceases to revolve around the sleeve shaft 30 center line. Rotation of the sleeve shaft 30 and sleeve shaft crank 30, carrying the annular slot 574, is continued, however, until the position of the lug 570 has been shifted to the spring end of the slot 574, thereby further compressing the spring 568 within the housing 566 on the sleeve shaft crank 550. Fig. 37 illustrates the position of the mechanism resulting from the above described movements and a comparison of Figs. 40 and 41 will reveal the rotation of the crank cam member 582 on the sleeve shaft 30 as the clamp shaft 76 is shifted in response to rotation of the clamp face cam member 584 (Fig. 40) being rotatably mounted on the sleeve shaft 30, is easily rotated in a counterclockwise direction by the revolving clamp shaft crank 578 until the closing lug 590 on the crank cam member 584 is adjacent the downwardly extending driving finger 594 integral with the cam driver 592. With the clamp shaft in the alignment position, the clamp face cam follower lever 78 is shifted in response to rotation of the clamp face cam J by the cam shaft 22. Through the described linkage, including the universal joints 600, the cam driver 592 is turned in a clockwise direction on the sleeve shaft 30. The downwardly extending finger 594 (Fig. 41) on the cam driver 592 engages the closing lug 590 on the crank cam member 584 and rotates the latter 584 about the sleeve shaft 30, causing the cam lobe 582 on the crank cam 584 to engage the closing follower 580 on the U-shaped clamp shaft crank 578, thereby rotating the clamp shaft crank 578 and clamp shaft 76 in a counterclockwise direction and moving the face 576 of the clamp 74 into contact with the sleeve 60 periphery (Fig. 42). The closing of the clamp 74 (Fig. 44) forces the leads 56 radially toward the center line of the sleeve shaft 30, being guided on one side by a lead alignment block 68 and on the other side of the lead stop 72. With the clamp 74 fully closed, the inside coil lead 56I seated in the sleeve recess 70 and the outside coil lead 56X is positioned in the clamp recess 80, as illustrated in Figs. 42 and 44.

At this point in the sequence of operation, it should be noted that the coil 36 is lowered from the semi-inserted position to the inserted position by the coil-pull-down arm 44, previously described. This timed relation can be seen in Fig. 58.

Returning to the description of the operational sequence of the sleeve shaft mechanism 30 and the lead clamp mechanism 74, the sleeve shaft face cam I next shifts the follower lever 552 to return the sleeve 60 to its starting position (Fig. 36), where the leads 56 will be staked (Figs. 27 and 28), as will be described hereinafter. The sleeve, having the inside lead 56I in the sleeve recess 70, immediately reacts to the motion of the follower lever 552 through the described linkage and begins to rotate in a clockwise direction. The spring housing 566 mounted on the sleeve shaft crank 550 also rotates in a clockwise direction, gradually allowing the compressed spring 568 within the housing 566 to extend to its original position. The pressure of the spring 568 against the downwardly extending lug 570 of the clamp shaft supporting member 572 detains the clamp shaft end of the said member 572 against the stop 608 mounted on the face 484 of the connecting unit 2 until the lug 570 is engaged by the opposite end of the annular slot 574. It is this delay in the start of the return motion of the clamp shaft supporting member 572 which separates the leads 56 held in the sleeve and clamp recesses 70 and 80 an amount equal to the distance between adjacent commutator slots. Fig. 45 illustrates the positions of the separated leads 56I and 56E.

As the clamp shaft 76 is revolved around the sleeve shaft 30 to its starting position, the clamp shaft crank 578, mounted on the clamp shaft 76, engages the cam lobe 582 of the crank cam member 584 rotating the latter on the sleeve shaft 30 in a clockwise direction until the opening lug 588 on the crank cam member 584 is adjacent the downwardly extending driving finger 594 integral with the cam driver 592.

When the sleeve shaft 30 has assumed the position it had at the start of the cycle, but with the clamp 74 closed instead of open, a staking tool 98 (Fig. 27) is aligned with the leads 56 in a staking attitude. After completion of the staking phase of the operation, by which the leads 56 are trimmed and connected to the commutator 50, which will be explained later, the lead clamp 74 is opened and assumes the original starting position prior to the beginning of the next cycle. To accomplish the opening movement of the clamp 74, the clamp face cam J, (Figs. 40, 41, and 42), through the face cam follower 604, pivots the follower lever 78 moving the cam driver 592 in a counterclockwise direction by means of the connecting rod 598 and universal joints 600. The downwardly extending driving finger 594 integral with the cam driver 592 engages the opening lug 588 on the crank cam member 584 and drives the member 584 on the sleeve shaft 30 in a counterclockwise direction. The cam lobe 582 on the crank cam member 584 is rotated past the opening follower 581 of the U-shaped clamp shaft crank 578, thereby revolving the clamp shaft crank 578 and attached clamp shaft 76, and rotating the clamp 74 from the closed position against the surface of the sleeve 60 to the open position from which it originally started.

Scrap arm mechanism

The two severed tip ends 95 (Fig. 51) of two armature coil leads 56, which are trimmed to a correct length prior to connection with the commutator 50, by a method to be described later, without special provision for their removal, will fall into operating parts of the mechanism of the machine with there being a strong possibility that the machine would fail, or be damaged, from any accumulation of these severed ends 95. Means is, therefore, provided, including a scrap arm 102 and jaw 104, whose function is to grasp and hold two coil lead extremities 94 (Fig. 50) prior to, and during, a trimming phase of the machine cycle and to transport the two severed ends 95, or scrap, to a position remote from the area surrounding the work shaft 32 where the scrap is dropped into a suitable container for disposal. Reference is made to Figs. 1, 26, 29, 30, 43, and 49 through 52 in the following description of the scrap arm and jaw mechanism.

A support bracket 612, best seen in Fig. 1, is attached to the face 484 of the connecting unit 2 and journals the upper end of a vertical tube 614. A lower support bracket 616, also attached to the face 484 of the connecting unit 2, provides a lower journal for the tube 614. As may be seen (Figs. 29 and 43), a conventional retaining device 618 secures the tube 614 in place at its lower end. A tubular spacer 620 separates the lower bracket 616 from a scrap arm 102 having an integral tubular support portion 622 secured to the tube 614 by means of a clamping bolt 624 which is fitted into suitable apertures and extends across a vertical slot 628 defined by shoulders 626 and 630 and also cut through the wall of the tube 614. The laterally-extending, horizontal portion of the arm 102 supports, at its distal end, a depending tubular portion 634 which journals a stub shaft 636 of a front jaw crank 637, which will be described later.

Above the upper support bracket 612, the tube 614 fixedly carries a horizontally-disposed crank 638 (Fig. 43), the end of which is pivotally secured to one end of a connecting rod 640, which passes through an opening 641 (Fig. 25) in the face 484 of the connecting unit 2, as shown in Fig. 51, and is pivotally secured to an end of follower lever 642 which swings from a pivotal connection with a bracket 644 secured to the inside of the face 484. A roller 646 is medially attached to the follower lever 642 and is positioned to follow a groove 648 impressed in the upper side of a face cam K secured to the cam shaft 22 of the connecting unit 2.

A plate cam L (Fig. 50) is mounted on the cam shaft 22 and is attached to the face cam K (Fig. 25) to insure proper timing between the scrap arm 102 and the scrap jaw 104. A roller follower 652 contacts the periphery of the plate cam L, as shown in Fig. 50, and is rotatably attached to a follower lever 654 pivoted at one end on a bracket 656 attached to the inner side of the face 484 of the connecting unit 2. The opposite end of the follower lever 654 is provided with a flatted surface 658 having a spherical indentation 662 which serves as a seat for the rounded end 664 of a push rod 666 which extends through an aperture 668 in the face 484 of the connecting unit 2 and has a spherical connection, similar to the one previously described, with an upright leg 670 (Fig. 52) of an L-shaped upper pivot member 672, which is rotatably mounted on a pin 674 extending horizontally through an intersection of its leg members 670 and 676 and journaled in a clevis type bracket 678 attached to the bottom side of the upper support bracket 612 between the face 484 of the connecting unit 2 and the tume 614, as shown in Fig. 1. The horizontal leg 676 (Fig. 52) of the upper pivot member 672 extends through a clearance hole (not shown) in the wall of the tube 614 and is provided with a spherical indentation 682 on the lower side thereof to receive the upper, rounded end 684 of a vertical push rod 686 located within the tube 614.

The lower end of the vertical push rod 686 is rounded at 688 and is seated in a spherical indentation 690 provided in the upper side of the horizontal leg 692 of a lower L-shaped pivot member 694. The lower pivot member 694 is similar to the upper pivot member 672, but is inverted in the mechanism, as can be seen in the schematic representation of the push rod system in Fig. 52. The horizontal leg 692 of the lower pivot member 694 extends through the slot 628 (Fig. 50) in the tube 614 to actuate the vertical leg 696, the pivot member 694 being pivotally mounted on a pin 698 journaled in the shoulders 626 and 630 and positioned below and parallel to the clamping bolt 624. A lower horizontally-disposed push rod 700 has rounded ends 702 and 704 seated in spherical indentations 706 and 708 in the vertical leg 696 of the lower pivot member 694 and the front jaw crank 660 (Fig. 50) respectively. A spring 712, is under tension between a vertical stud 714 attached to the upper side of the horizontal portion of the scrap arm 102 and the front jaw crank 660 by notch 716, which serves to firmly seat all the rounded push rod ends in their cooperating spherical indentations and to assure contact between the roller follower 652 and the periphery of the plate cam L.

Fig. 30 illustrates that the back jaw crank 637 is provided with a lower cylindrical portion 636, as previously mentioned, which is journaled by, and extends through, the depending portion 634 of the scrap arm 102. The lower end of the cylindrical portion 636 is fastened by a key 718, or other suitable means, to the back jaw 720. The front jaw spindle 722 is journaled in and extends the full length of the cylindrical portion 636 of the back jaw crank 637, being keyed at the top to the front jaw crank 660 and at the bottom to the front jaw 104.

In Fig. 43, the positions of a spring retainer 724 and a crank stop 726 supported by the horizontal portion of the scrap arm 102 are shown. The back jaw crank 637 extends between the retainer 724 and the crank stop 726. A spring 728 is provided, being seated on the retainer 724 and acting on the back jaw crank 637, thereby urging the crank 637 and back jaw 720 to rotate in a clockwise direction around the vertical center line of the spindle 722.

The lead contacting and gripping surfaces of the front and back jaws 104 and 720 are provided with cooperating recesses 730 which provides a relatively positive means of gripping coil leads 56 by their ends.

The device operates as follows: After the sleeve shaft 30 has returned to its starting position and each of the coil leads 56I and 56X is locked in its particular recess 80 and 70, and is aligned with its respective commutator slot 96, the power shaft 24 continues to rotate the cam shaft 22 through the engaged coupling elements 26 and 28. The face cam K shifts the follower lever 642 and connecting rod 640 to rotate the scrap arm crank 638, tube 614, and scrap arm 104 to the position shown in phantom in Fig. 49. As the arm 102 moves to this position, the jaws 104 and 720 remain in a separated or open relation and the front jaw 104 enters the transverse groove 538 in the wall of the sleeve 60, thereby gaining a position between the lead extremities 94 and the sleeve 60 proper, as can be seen in Figs. 49 and 50 in the dotted views.

The plate cam L now pivots the follower lever 654 to push the upper push rod 666 and rotate the upper pivot member 672. The vertical push rod 686 is lowered, rotating the lower pivot member 694 and pushing the lower horizontal push rod 700 against the front jaw crank 660. The front jaw crank 660, spindle 722, and front jaw 104 are rotated in a counterclockwise direction (Fig. 50), thereby further extending the tensioned spring 712. The front jaw 104 moves out of the transverse groove 538 and pushes the lead extremities 94 away from the sleeve 60. As the front jaw 104 approaches the back jaw 720, the lead extremities are pinched by the lead retaining recesses 730 of the jaws 720 and 104 and continued counterclockwise rotation rotation of the front jaw 104 causes rotation of the back jaw 720 and back jaw crank 637. The back jaw crank 637 is moved away from the stop 726, so that the spring 728, now further compressed, provides the pressure with which the lead extremities are held by the jaws 104 and 720. The final closed positions of the jaws 104 and 720, illustrated in Figs. 43 and 50, is shown by the graphs of Fig. 58 to be attained coincidentally with the act of connecting the leads 56 to the commutator 50.

Thereafter movement of the follower lever 642 by the face cam K causes the scrap arm crank 638, tube 614, and scrap arm 102 to be rotated to the starting position with the jaws 104 and 720 remaining in a closed relation, so that the severed lead ends are removed from the vicinity of the sleeve 60. With the scrap arm 102 in the position shown in Fig. 51, the plate cam L allows the compressed spring 728 to return the back jaw crank 637 to a position against the stop 726. The tensioned spring 712 causes the push rod linkage, illustrated in Fig. 52, to be retracted and rotates the front jaw crank 660, spindle 722 and front jaw 104 in a clockwise direction, thereby separating and opening the jaws 104 and 720 and allowing the severed lead ends 95 to fall into a suitable container. The open position of jaw 104 is shown in Fig. 51 in a dotted view.

*Lead trimming and connecting mechanisms*

After two uninsulated armature coil leads 56I and 56X have been finally located and grasped by the Scrap Arm and Jaw Mechanism, already described, the leads 56I and 56X are trimmed to the correct length and connected, or staked, to the commutator by being pressed into slots 54 in the commutator 50 of the armature core 48 by a Lead Trimming and Connecting Mechanism. Reference to Figs. 25 through 28 and 47 and 48 is made in connection with the description of the operation of this mechanism.

Two parallel, nearly rectangular, trimming and connecting blades 99 (Fig. 48) are vertically oriented, each lying in a plane parallel to a vertical plane between them containing a radius of the sleeve shaft 30. The blades 99 are separated by a distance equal to the distance between adjacent commutator slots 96 (Fig. 46) at the periphery of the commutator 50, and are attached at the bottom and one end to a horizontal blade holder 738 mounted on a vertical tool carrier 740, as illustrated in Fig. 48. The edges of the two unattached blade ends are shaped to act as lead contacting surfaces, each blade having a flat, transverse, vertical trimming portion 100 at the top of the blade 99, just above a vertically inclined connecting portion 110 extending downwardly and forwardly to the blade holder 738. The trimming portions 100 cooperate with upper ends of trim and guide slots 112 in the sleeve 60 to form a shear to cut off excessive length 95 (Fig. 28) from the coil leads 56I and 56X before the leads are pressed into the commutator slots 96. The inclined profile of the connecting portions 110 serves to firmly seat the trimmed coil leads 56T on the bottom of the commutator slots 96. A plan view of the connection portion 110 of the blades would disclose the distal sides 742 (Fig. 48), or sides farthest removed from each other, to be convergingly tapered for the purpose of conforming to the horizontal angle formed by the corresponding distal sides of the adjacent commutator slots 96 (Fig. 46).

The vertical tool carrier 740, on which the blade holder 738 is mounted, extends generally in an upwardly direction, being horizontally offset toward and parallel to the face 484 of the connecting unit 2. Two nuts 744 (Fig. 1) threadedly hold the tool carrier 740 against two shoulders 746 (Fig. 47) on two horizontal, parallel rods 748 lying in a vertical plane parallel to another vertical plane passing equidistantly between the vertical blades 99 mounted on the blade holder 738. The rods 748 pass between the sleeve shaft 30 and the face 484 of the connecting unit 2, the latter supporting a housing 750 (Fig. 47) containing two bearings in which the rods 748 are slideably mounted. The ends of the rods 748 opposite the tool carrier mounting 740 are also threaded, two nuts 752 being tightened thereon to secure two plates 754 and 756 in place. The nuts 752 bear against a vertically oriented staking plate 754, mounted on the rods 748. A return plate 756, similarly oriented, is also mounted on the rods 748, but is held against a shoulder 758 on each rod 748 by the pressure of the nuts 752. The means of pressure transfer between the plates 754 and 756 is provided by tubular spacers 759 mounted on each of the rods 748. A rounded end 760 of a face cam follower lever 762 projects through an opening 764 in the face 484 of the connecting unit 2 at a point vertically midway between the rods 748. At approximately the midpoint of the follower lever 762, a roller type cam follower 766 is mounted, fitting rotatably into a vertical groove 768 in a horizontal face cam M attached to a vertical cam shaft 22 journaled in the housing 486 of the connecting unit 2 attached to the base unit 1. The end of the cam follower lever 762 opposite the rounded end 760 is pivotally mounted on the vertical locating shaft 18 secured to the connecting unit housing 486 attached to the base unit, as already described.

The sequential operation of the Trimming and Connecting Mechanism will now be traced. When the connecting unit 2 is in an operating position, the driving motor 116 (Fig. 3), through the gear train 122, rotates the power shaft 24. Two coupling elements 26 and 28 transfer the power shaft 24 rotation to the cam shaft 22 turning the face cam M. The cam groove 768 (Fig. 47) shifts the cam follower 766 and the cam follower lever 762, causing the rounded end 760 of the follower lever 762 to thrust the staking plate 754 and the retaining nuts 752, so that the rods 748 are moved within the housing 750 (from left to right in Figs. 27, 28, and 47), also moving the tool carrier 740, nuts 744, blades 99 and blade holder 738, the latter 738 moving radially toward the sleeve shaft 30 center line.

The blades 99 initially pass through clearance slots 113 in the bottom of the closed lead clamp 74 and the two armature coil leads held in the sleeve and clamp recesses 70 and 80 are first contacted by the front face 770 of the blade 99 (Fig. 27). As the blades 99 continue to move toward the sleeve 60, the coil leads 56 are bent over the inclined connecting portions 110 and finally are met by the trimming portions 100 of the blades 99. With the outer extremities 94 of the armature coil leads 56 grasped by a Scrap Arm and Jaw Mechanism, the leads 56 are trimmed, or sheared, to the correct length when the trim portions 100 of the blades 99 enter their respective trim and guide slots 112 on the sleeve 60. The trimming action is accomplished by the constriction of the vertical clearance space between the top of the blades 99 and the top, or closed end, of the trim and guide slots 112 in the sleeve 60 as the blades 99 enter the slots 112. Leaving the severed coil ends 95 in the grasp of the Scrap Arm and Jaw Mechanism, the forward faces of the two blades 99 push the two trimmed leads 56T through their respective trim and guide slots 112 in the sleeve 60 and into their respective adjacent commutator slots 96. The distal sides of the adjacent commutator slots 96 do not interfere with the travel of the blades 99 because of the taper 742 on the connecting portions 110 of the blades 99, and the trimmed armature leads 56T are seated at the bottom of the commutator slots 96 by the inclined portions 110 of the connecting blades 99 at the extreme end of the stroke of the connecting tool.

Responding to the groove construction of the face cam M (Fig. 47) driven by the cam shaft 22, the roller type cam follower 766 returns the cam follower lever 762 to its original position, thereby exerting pressure on the return plate 756 through the rounded end 760 on the cam follower lever 762. The return plate 756 bears against the shoulders 758 on the rods 748 and the rods 748 slide within the support bearings in the housing 750 on the face 484 of the connecting unit 2 moving the plates 754 and 756, nuts 744 and 752, tool carrier 740, blades 99 and blade holder 738 to their starting positions.

Indexing mechanism for armature

After the trimmed leads 56T of the inserted coil 36 have been connected to the commutator 50 and the staking tool 98 has passed beyond the clearance slots 113 in the bottom of the leads clamp 74 during its return stroke, the armature core 48 and all previously inserted and connected coils are rotated in a counterclockwise direction by an amount which will position the adjacent empty armature core slot 54 (Fig. 19) to receive the side of the next coil from the magazine unit 3. In order to maintain the coils 36 in constant radial relationship when inserted and connected in the core 48, as illustrated in Fig. 56, the coil guide 114 is also rotated an equal amount in a counterclockwise direction. The figures numbered 3, 5, 6 and 53 through 57 disclose details of an indexing mechanism, by which the above described motions are achieved.

As has been previously described, a horizontal face cam A (Fig. 53) is secured to the power shaft 24 having a path 772 impressed in its upper side which loosely receives a roller type follower 774 rotatably mounted on one end of a crank 776 secured to the lower end of an indexing shaft 778 rotatably mounted in conventional bearings (not shown) in the mounting plate 132 and the top plate 130 of the base unit 1 (Fig. 3).

The diametrically opposed arm 780 relative to arm 776 is attached to the indexing shaft 778 at a point above the mounting plate 132 and is rotatably secured to one end of a link 782. The other end of the link 782 is pivotally attached to an indexing member 784 (Fig. 6) comprising connected upper and lower portions 786 and 788 freely rotatable on shouldered bearings 790 and 792 mounted on shaft indexing plate 794 fixedly attached to the work shaft 32 by means of keys 796. The lower portion 788 of the indexing member 784 is provided with an enlarged peripheral section 798 (Fig. 54), which engages the check pawl roller 800 under circumstances to be described. A lower pawl 802 is rotatably attached to a vertical pin 804 mounted between the upper and lower portions 786 and 788 of the indexing member 784.

A spring 806 (Fig. 53) compressed between the lower pawl 802 and the indexing member 784 urges the lower pawl 802 to engage and maintain contact with the shaft indexing plate 794. The lower pawl 802 is disposed in angular relationship to the shaft indexing plate 794 and engages notches 808 provided in the periphery thereof to drive the plate 794 in a counterclockwise direction only.

An upper arm 810 (Figs. 3 and 56) has one end fixedly attached to the upper end of the indexing shaft 778 above the top plate 130 of the base unit 1, while the opposite end is pivotally secured to one end of a horizontally oriented bar 812 attached to a pivot arm 814 rotatably mounted on a vertical anchor pin 816 secured by conventional threaded means to the top plate 130. The bar 812 is provided with a rigidly attached stud 818 anchoring one end of a tensioned spring 820, which is secured to upper pawl member 822 pivotally mounted on the bar 812, and which urges the upper pawl member 822 to engage and maintain contact with an indexing plate 824, an integral part of the coil guide 114. The coil guide 114 comprises the horizontal indexing plate 824 provided with fourteen equally-spaced driving shoulders 826 arranged on its perimeter, cooperating with the pawl member 822, and supporting fourteen radially disposed, upright structural members 828 adjacent taller, tangentially disposed rib members 830 separated by vertical slots 832, each adapted to admit and guide one armature coil 36.

The coil guide 114 is positioned concentrically with respect to the work shaft 32 and rotates around a center plate 834 which is secured to the top plate 130 and is provided with vertical holes, utilized by the coil-pull-down arm 44, locator 53, and chuck 52. A flat ring 836 (Fig. 5) of brake lining material of conventional composition surrounds the center plate 834 and separates the top plate 130 from the indexing plate 824 of the coil guide 114. A dished ring 838 is positioned around the coil guide structural members 828, resting on, and overhanging, the indexing plate 824 thereof, and is provided with clearances 840 and 842 (Fig. 57) for the upper arm 810 and the bar 812. A plurality of chamfered holes 844 are distributed around the dished ring 838 extending downwardly through the base of a shell member 846 which surrounds the coil guide indexing plate 824 and the brake lining ring 836, and through the top plate 130, to which the shell member 846 is attached. Each hole 844 receives a vertical spindle 848 provided with a larger head portion to cooperate with the hole 844 chamfer, as can be seen in Fig. 5. Each spindle 848 carries a spring 850 compressed between the bottom side of the top plate 130 and a retaining disc 852 mounted on the spindle 848 and held in place by two conventional lock nuts 854 on the lower end of the spindle 848.

The check pawl roller 800, previously described and shown in Figs. 53 through 55, is vertically mounted on a check pawl 856 rotatably secured to a block 858 attached to the mounting plate 132. A tension spring 860 is fastened to a laterally extending projection 862 on the rear end of the check pawl 856 and is anchored to a post 864 attached to the block 858, thereby urging the check pawl 856 to constantly engage the notches 808 in the periphery of the indexing plate 794. The angular relationship between the check pawl 856 and the plate 794 prevents counterclockwise rotation of the plate 794 when the check pawl 856 registers with a notch 808 in the plate 794.

Turning now to the operation of the above described mechanism, the actual indexing of the core 48 and the coil guide 114 begins after the coil leads 56T are connected to the commutator 50, as can be seen in the graphs in Fig. 58. However, a prior "cocking" or pre-setting of the indexing mechanism is accomplished as rotation of the face cam A causes the groove 772 to move the follower 774 and crank 776, thereby turning the indexing shaft 778 and swinging both the lower arm 780 and upper arm 810 in a clockwise direction.

The link 782 rotates the indexing member 784 in a clockwise direction on the shaft indexing plate 794 causing the enlarged peripheral section 798 of the member 784 to engage the check pawl roller 800, thereby disengaging the check pawl 856 from any contact with the shaft indexing plate 794. At the same time, the lower pawl 802 is carried clockwise by the member 784 until it is seated in an adjacent notch 808 of the plate 794 by the spring 806, as is clearly shown in Fig. 53. Simultaneously, the upper pawl 822 (Fig. 56) is moved clockwise by the bar 812 to the adjacent driving shoulder 826 of the coil guide indexing plate 824 and is positioned against the shoulder 826 by the spring 820. The indexing mechanism is now fully "cocked," having assumed a position from which the indexing motions are started.

The direction of rotation of the indexing shaft 778 (Fig. 53) is reversed by the face cam groove 772, follower 774, and crank 776. The lower arm 780 pulls the link 782 which rotates the indexing member 784 in a counterclockwise direction. Since the lower pawl 802 is drivingly registered with a notch 808, the shaft indexing plate 794, working shaft 32 and armature core 48 are also rotated clockwise through one-fourteenth of a revolution. As the indexing member 784 is rotated, the enlarged peripheral section 798 (Fig. 55) on the lower portion 788 disengages the check pawl roller 800 and the spring 860 causes the check pawl 856 to re-engage the shaft indexing plate 794 prior to completion of the indexing movement. The check pawl 856 slips into the first passing notch 808, thereby preventing rotation of the plate 794 and work shaft 32 past the desired station and positively locating the armature core slot 54 for receipt of the next coil 36.

Simultaneously, the upper arm 810 (Figs. 56 and 57) draws the upper pawl 822 on the bar 812 in a counter-clockwise direction and, since the upper pawl 822 is positioned against a driving shoulder 826 of the coil guide indexing plate 824, the entire coil guide 114 is rotated one-fourteenth of a revolution. The frictional resistance created by the pressure of the springs 850 (Fig. 5) on the brake lining 836 prevents the coil guide 114 from overrunning its station and positions a guide space 832 for receipt of the next coil 36 from magazine unit 3, as has already been described.

Coil locking mechanism

An armature coil locking mechanism, illustrated in Figs. 5, 6, 54, 55, and 57, is operative after the completion of the above described indexing cycle following the connection to the commutator 50 of the leads 56 of the fourteenth, and last, inserted coil side. The air operated chuck 52 (Figs. 3 and 6), supporting the armature core 48, is rotated counter clockwise 3/14 of a revolution while the coil guide 114 remains stationary, thereby canting and nesting the coils 36 around the core 48, as shown in Fig. 57, to allow a coil retaining ring R (Fig. 2) to be assembled around the uninserted coil sides. The canting motion causes the closed ends of the coil 36 to assume overhanging positions at opposite ends of the core laminations 49, thereby longitudinally locking the coil 36 on the core 48. When the air-operated chuck 52 is opened by the operator and the armature removed, the armature coils 36 have a tendency to resume a radial relationship with the core 48, which actually rotates clockwise allowing the free coil sides of the coils 36 to expand against the retaining ring R. The ring, initially resting on the tops of the structural members 828 (Fig. 5), is held in place by the pressure of the outwardly expanding coils 36 and the entire assembly can be lifted from the opened air-operated chuck 52 removed from the machine by the operator.

Mounted at the top of the drive shaft 128, the timing pinion 136, previously described, drivingly meshes with a horizontal timing gear 866 (Fig. 3) rotatably secured to a vertical stub shaft 868 rigidly rising from the top plate 130 of the base unit 1. The tooth ratio of the timing gear 866 to the timing pinion 136 is fourteen-to-one, so that fourteen revolutions of the latter causes one revolution of the former. A flat trigger bar 870 is attached to the upper side of the timing gear 866 and is so positioned as to actuate once each revolution of the gear a conventional signal switch 872, attached to the inside of the housing 138. The switch 872 signals are received by a solenoid valve SV–1 (Fig. 59) which actuates a horizontal air cylinder 874 to drive the coil locking mechanism. Shown schematically in Fig. 3, the air cylinder 874 is fixed in place on the mounting plate 132 of the base unit 1.

Attached to the piston rod 876 of the air cylinder 874 is a rack 878 positioned to mesh with a sector gear 880 integrally carried by an upper part 882 (Fig. 6) of a canting member 884. In addition to the upper part 882, the coil canting member 884 integrally comprises a connecting part 886 and a lower part 888 and is provided with a canting pawl 890 (Figs. 54 and 55) rotatably attached to a stationary vertical pin 892 mounted between the upper and lower parts 882 and 888. The pawl 890 is constantly urged to maintain contact with the notched shaft indexing plate 794 by a spring 894 compressed between the connecting part 886 and the pawl 890 and is disposed at such an angle to the plate 794 that it drivingly engages the notches 808 therein when rotated in a counterclockwise direction only. The lower part 888 has an enlarged peripheral section 896, similar to the enlarged peripheral section 798 on the lower portion 788 of the indexing member 784, for the purpose of engaging the check pawl roller 800, as will be explained hereinafter. The canting member 884 rotates freely on shoulder bearings 898 mounted on the shaft indexing plate 794 and the indexing member 784, as can be seen in Fig. 6.

In operation, the trigger bar 870 on the timing gear 866 trips the signal switch 872 to operate the air cylinder 874 after the timing pinion 136 and drive shaft 128 have been revolved fourteen times by the gear 124, gear train 122, pulley 120, belt 118, and motor 116, previously described and illustrated in Fig. 3. The piston rod 876 (Fig. 55) is first drawn into the air cylinder 874 thereby moving the rack 878 from right to left and revolving the canting member 884 in a clockwise direction in the Figs. 53 through 55. Under compulsion of the spring 894, the canting pawl 890 maintains contact with the indexing plate 794 as it is carried clockwise three-fourteenths of a revolution, finally being seated in a notch 808 in the periphery of the plate 794. The enlarged peripheral section 896 of the lower part 888 engages the check pawl roller 800 and the check pawl 856 is disengaged from contact with the indexing plate 794 during the clockwise movement of the canting member. Fig. 55 illustrates the position of the various parts at a time when the piston of the air cylinder 874 is at the end of its retracted stroke.

At the end of the retracted stroke of the piston, however, a valve V–6, shown schematically in Fig. 59, is tripped by the rack and operates to reverse the direction of air flow in the cylinder, driving the piston rod 876 and rack 878 (Fig. 53) outwardly. The rack 878 rotates the canting member 884 in a counterclockwise direction and, since the canting pawl 890 drivingly engages a notch 808 in the indexing plate 794, the plate 794, workshaft 32, air-operated chuck 52, and armature core 48 are all rotated. Near the end of the outward stroke of the air cylinder piston, the check pawl roller 800 is disengaged from the enlarged peripheral section 896 of the lower part 888 of the canting member 884 and the check pawl 856 enters the first passing notch 808 under the compulsion of the spring 894 to halt further rotation of the indexing plate 794, workshaft 32, and armature core 48. The final position of the partially constructed armature, ready for the assembly of the ring, is illustrated in Fig. 57 which clearly shows the coils 36 in the canted position.

Brake mechanism

The motor driven parts of the machine are all brought to a halt immediately after the indexing action following the insertion and connection of the fourteenth and last coil 36 to the armature core 48. The angular relationship existing at that instant must be substantially preserved during the time consumed by the operator in unloading and loading the chuck 52 to assure the alignment of coupling elements 26 and 28 when the connecting unit 2 is moved from a parked position to an operating position at the start of the next cycle. This is accomplished in the following manner.

All motor driven parts are quickly braked to a standstill by means of a formed brake shoe 900 being pressed into the groove of the pulley mounted on the shaft of the motor 116 (Figs. 3 and 59). As can be seen in Fig. 59, the shoe 900 is mounted on a piston rod 901 driven by air cylinder B, which is activated by the same solenoid valve SV–5 utilized to activate the air cylinder 14 to raise and park the connecting unit 2. The signal to which the solenoid valve SV–5 responds is the same as that received by the solenoid valve SV–1 (discussed in connection with the coil locking mechanism) and originates in the switch 872 located in the housing 138 (Fig. 3). It should be clear that the motor 116 will be held stationary by the brake cylinder B whenever the air driven parts are operating and whenever the connecting unit 2 is not in the operating position. With one exception, the stationary motor 116 will hold all the motor driven parts immobile by the same pulleys, gears trains and mechanisms which have been described hereinbefore as transmitting motion.

The existing exception is the connecting unit 2, which, when not in the operating position, is mechanically disconnected from the motor 116 by the separation of the coupling elements 26 and 28. A braking device is, therefore, provided on the connecting unit 2 which is activated to prevent rotation of the cam shaft 22 whenever the connecting unit is removed from the operating position. It can best be seen in Figs. 1 and 25. A vertically oriented spindle 902 is slideably mounted in the bottom plate 498 of the connecting unit housing 486. An inverted L-shaped member 904 is attached to the upper end of the spindle 902 above the plate 498 and is so positioned that a horizontal leg of the member 904 overhangs a portion of the disc of cam M, previously described. The portion of the spindle 902 below the plate 498 supports a stop member 906 adapted to contact an adjustable stop 908 (Fig. 1) mounted on the upper side of the base unit 1 at predetermined times. A compressed coil spring 910 is mounted on the spindle 902 between the stop member 906 and the bottom plate 498.

When the connecting unit 2 is in the operating position, its braking device is inoperative and appears substantially as shown in Fig. 25. The stop 908 on the base unit 1 lifts the stop member 906, spindle 902, and member 904 against the bias of the compressed spring 910, so that the cam M, shaft 22 and other cam members of the connecting unit 2 are free to rotate in response to the action of the motor 116. However, as soon as the connecting unit 2 is lifted toward its parked position, the spring 910 thrusts the stop member 906 downwardly with respect to the housing 486. The spindle 902 and member 904 move downwardly with the stop member 906 until the overhanging portion of the member 904 contacts the disc of cam M, thereby making the braking device operative. Thereafter, the cam M, shaft 22 and other rotating parts of the connecting unit 2 are restrained from rotation by the force of the spring 910 until the unit 2 is returned to the operating position.

The operation of the machine has already been set forth above and will not be described again.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. In an assembling machine for positioning the inner side of a coil in the slots of an armature, a magazine member for substantially identical pre-wound coils consisting of a holding frame open at one end to allow removal of coils, spring-biased means to urge the coils along the frame toward its open end, retaining means capable of being released to hold the coils adjacent the open end of the frame, holding means to grasp a single coil at the open end of the frame when the retaining means is momentarily released, a second resilient holding means, means to advance the first holding means forwardly to position the coil just grasped into the second holding means, means to advance the second holding means into the locus of the armature, means to slide the coil from the second holding means to position the coil into a slot of the armature, means to cause sequential rotation of the armature to present the slots one after another, and automatic means to cause sequential operation of the various means whereby the coils are positioned individually in the slots of the armature.

2. In an assembling machine for positioning the inner side of a pre-wound coil in the slots of an armature, a horizontal magazine member for substantially identical coils consisting of a holding frame open at one end adjacent the armature to allow removal of coils, spring-biased means to urge the coils along the frame toward its open end, retaining means capable of being released to hold the coils adjacent the open end of the frame, holding means to grasp a single coil at the open end of the frame when the retaining means is momentarily released, a second resilient holding means, means to advance the first holding means forwardly to position the coil just grasped into the second holding means, means to advance the second holding means into the locus of the armature, means to grasp the coil to position the coil into a slot of the armature, means to sequentially rotate the armature to present an open slot, and automatic means to cause sequential operation of the various means, whereby the coils are positioned sequentially in the slots of the armature.

3. In an assembling machine for positioning the inner side of a pre-wound coil in the slots of an armature, a magazine member for substantially identical coils consisting of a holding frame open at one end to allow removal of coils, spring-biased means to urge the coils along the frame toward its open end, retaining means capable of being released to hold the coils adjacent the open end of the frame, separable holding means to grasp a single coil at its sides at the open end of the frame when the retaining means is momentarily released, a second resilient holding means, means to advance the first holding means with its coil forwardly to release the coil just grasped in position in the second holding means, means to advance the second holding means into the locus of the armature, means to grasp the lower coil side to slide the coil out of the second holding means to position the coil into a slot of the armature, means to sequentially rotate the armature to present an open slot, and automatic means to cause sequential operation of the various means whereby the coils are positioned sequentially in the slots of the armature.

4. Means for rotatably securing an armature assembly comprising a shaft having a slotted core body, means cooperating with the first means for gripping a prewound coil from a magazine and linearly inserting the inner side of the coil in a slot by longitudinal movement in the slot, means to hold the inserted coil in a radial position with reference to the armature core, means to rotate the armature core sequentially one slot to displace the inserted coil circumferentially from its initial position to allow insertion of the coils one by one, means cooperating with the holding means to restrain the free coil sides from outward movement during the rotation of the armature, and means cooperating with the holding means to rotate the armature and the inner sides of the coils to move the coils from their radial positions relative to the armature core to a nesting relation.

5. Means for rotatably securing an armature assembly comprising a shaft having a slotted core body, means cooperating with the first means for gripping a prewound coil from a magazine and linearly inserting the inner side of the coil in a slot by longitudinal movement in the slot, means to hold the inserted coil in a radial position with reference to the armature core, means to rotate the armature core sequentially one slot to displace the inserted radially-extending coil circumferentially from its initial position to allow insertion of the inner sides of the coils one by one, means cooperating with the holding means to restrain the free coil sides from outward movement during the rotation of the armature, means cooperating with the holding means to rotate the armature and the inner sides of the coils to move the coils from their radial positions relative to the armature core to a nesting relation, and means to hold the coils in nesting relation.

6. In an assembling machine, the combination of means for rotatably supporting an armature assembly including a slotted and insulated core and a commutator having slotted segments, means for delivering an armature coil consisting of two wires from a magazine to a preinserted position longitudinally displaced relative to the armature core, means for causing relative motion between the coil and the core whereby the inner coil side is moved longitudinally in a core slot to an inserted position therein, means having several relatively movable parts for separating and gripping the end portions of the leads of the inserted coil side to align the lead ends with the slot in the commutator segment to be connected thereto, means for causing automatic repetition of the movement of all the above said means, and means for operating the above said means in a timed relation with all the other said means.

7. In an assembling machine, the combination of means for rotatably supporting an armature assembly including a slotted and insulated core and a commutator having slotted segments, means for holding a plurality of prewound two-wire armature coils to be positioned in the armature in a magazine in a predetermined position relative to the core, means for removing a single armature coil from the magazine to a preinserted position longitudinally displaced from the armature, means for aligning the inner coil side of the armature coil with a core slot, means for causing relative motion between the coil and the core whereby the inner coil side is moved longitudinally in the core slot to an inserted position therein, means including several relatively movable parts to first align the leads and then separate and grip them whereby the leads may be aligned and connected with the slots of the commutator segments, means for causing automatic repetition of the movement of all of the above said means, and means for operating each of the above said means in timed relation with all the other said means.

8. In an assembling machine, the combination of means for rotatably supporting an armature assembly including a slotted and insulated core and a commutator having slotted segments, means for holding a plurality of multi-wire armature coils in a magazine in a predetermined position relative to the core, means for delivering an armature coil from the magazine to a preinserted position longitudinally displaced above the armature core, means for causing relative motion between the coil and the core whereby the inner coil side is moved longitudinally in a core slot to an inserted position therein, means including parts having cooperative slots capable of being moved relative to each other a distance equal to the spacing of the slots in the commutator segments to separate and grip the coil leads in a predetermined relation, means for causing axial and rotational relative motion of an end portion of a lead of the inserted coil side with respect to the core whereby the end portion of the lead is aligned with a slot in a commutator segment and connected thereto, means for causing automatic repetition of the movement of all of the above said means, and means for operating each of the above means in a timed relation with all the other said means.

9. In an assembling machine, the combination of means for rotatably supporting an armature assembly including a slotted and insulated core and a commutator having slotted segments, means for holding a multi-wire coil in a preinserted position with its inner side aligned with a core slot, the inner coil side being longitudinally displaced from the core, means for gripping the coil and compressing the coil to a predetermined dimension and for transporting the inner coil side longitudinally into the core slot to an inserted position in the core, means including a part embracing the commutator and at least one more part movable relative thereto for separating and gripping the coil leads in a predetermined relation preparatory for aligning the ends of the coil leads with the commutator slots and for connection thereto by staking, means for causing automatic repetition of the movement of all the above said means, and means for operating each of the above said means in timed relation with all the other said means.

10. In an assembling machine, the combination of means for rotatably supporting an armature assembly including a slotted and insulated core and a commutator having slotted segments, means for aligning an inner side of a prewound coil consisting of two strands with a core slot, the coil being longitudinally displaced from the core, means for holding and releasing the coil at the aligned position, means for grasping the lower coil side and arranging the coil turns including the inner coil side into an imbricate pattern of thickness less than twice the wire diameter, means for transporting the coil in a longitudinal direction to move the inner coil side into the core slot to an inserted position in the core, means for stabilizing the coil in a radial position during a lead connecting phase of the machine cycle, means including several relatively movable parts for separating and gripping the inner coil leads in a predetermined relation, means for causing axial and rotational relative motion of the end portions of the leads of the inserted coil side with respect to the core whereby the end portions of the leads are aligned with slots in the commutator segments and connected thereto, means for causing automatic repetition of the movement of all the above said means, and means for operating each of the above said means in a timed relation with all the other said means.

11. In an assembling machine, the combination of means for rotatably supporting an armature assembly including a slotted and insulated core and a commutator having slotted segments, means for delivering a prewound multi-wire armature coil to a preinserted position longitudinally displaced relative to the armature core, means for causing relative motion between the coil and the core whereby a predetermined coil side is moved longitudinally in a core slot to an inserted position therein, means for confining the coil leads to a predetermined radius of the core, means including several relatively movable parts for separating and gripping the end portions of the leads of the inserted coil side by an amount equal to the distance between adjacent commutator slots whereby the leads are prepared for alignment and connection to the commutator segments, means for causing automatic repetition of the movement of all the above said means, and means for operating each of the above said means in timed relation with all the other said means.

12. In an assembling machine, the combination of means for rotatably supporting an armature assembly including a slotted and insulated core and a commutator having slotted segments, means for delivering a prewound multi-wire armature coil to a preinserted position relative to the armature core, means for causing relative motion between the coil and the core whereby a predetermined coil side is moved longitudinally in a core slot to an inserted position therein, means including several relatively movable parts for grasping and separating the leads and causing axial and rotative motion of an end portion of a predetermined lead of the inserted coil side with respect to the core whereby the end portion of the lead is aligned with a slot in the commutator segment to be connected thereto, means for trimming the coil lead to proper length, means for grasping and removing the severed portions of the lead trimmed from the lead by the said trimming means, means for securing the end portion of the lead to the commutator segment, means for causing automatic repetition of the movement of all the above said means until a coil is inserted in each armature slot, and means for operating each of the above said means in timed relation with all the other said means.

13. In an assembling machine, the combination of means to hold an armature core assembly in vertical position with its slotted commutator positioned above the core, said means being adapted to rotate the armature core in small steps about its axis equal to the spacing of the core slots, a magazine for prewound multi-wire coils to be inserted in the core disposed laterally of the armature, means to advance the coils singly from the magazine to a preinserted position above the core in a position aligned with an armature core slot, means to move the coil longitudinally into the core slot with the leads disposed toward the commutator, means to guide the inner leads of the inserted coil side to a predetermined position relative to the commutator, means including several relatively movable parts to grip and separate the lead ends to a distance equal to the distance between the slots of adjacent segments of the commutator preparatory to alignment with and connection to the selected commutator segments, and means cooperating with the above means to cause automatic operation of the means to complete a cycle whereby a coil is inserted in each slot of the armature core with its inner leads connected to the predetermined commutator segments.

14. In an assembling machine, the combination of means to hold an armature core assembly in vertical position with its slotted commutator positioned above the core, said means being adapted to rotate the armature core in small steps about its axis equal to the spacing of the core slots, a magazine for prewound multi-wire coils to be inserted in the core disposed laterally of the armature, means to advance the coils singly from the magazine to a preinserted position above the core in a position aligned with an armature core slot, means to compress the wires of the coil side to a dimension less than the opening of the core slot and to move the coil longitudinally of the core slot into the core slot with the leads disposed toward the commutator, means to guide the inner leads to a predetermined position relative to the commutator, means including several relatively movable parts to grip and separate the lead ends to a distance equal to the distance between the slots of adjacent segments of the commutator, means to rotate the leads to align them with slots of the selected commutator segments, means to trim the leads to predetermined length relative to the commutator, means to insert the lead ends into the commutator slots, means to grasp and remove the trimmed portions of the leads, and means cooperating with the above means to cause automatic operation of the means to complete a cycle whereby a coil is inserted in each slot of the armature core with its leads connected to the predetermined commutator segments.

References Cited in the file of this patent

UNITED STATES PATENTS

| | | |
|---|---|---|
| 1,402,217 | Cullin | Jan. 3, 1922 |
| 1,964,441 | Phelps et al. | June 26, 1934 |
| 2,074,366 | Collins et al. | Mar. 23, 1937 |
| 2,192,801 | Poole | Mar. 5, 1940 |
| 2,281,917 | Collins et al. | May 5, 1942 |
| 2,349,620 | Hansen et al. | May 23, 1944 |
| 2,421,115 | Carlson | May 27, 1947 |
| 2,703,923 | Caldwell | Mar. 15, 1955 |